US010899556B2

(12) United States Patent
Kjartansson et al.

(10) Patent No.: US 10,899,556 B2
(45) Date of Patent: Jan. 26, 2021

(54) DEVICE AND METHOD FOR TRANSPORTING MEAT PRODUCTS

(71) Applicant: MAREL POULTRY B.V., Boxmeer (NL)

(72) Inventors: Magnus Blondahl Kjartansson, Buford, GA (US); Elias Halldor Bjarnason, Viby (DK)

(73) Assignee: MAREL POULTRY B.V., Boxmeer (NL)

( * ) Notice: Subject to any disclaimer, the term of this patent is extended or adjusted under 35 U.S.C. 154(b) by 0 days.

(21) Appl. No.: 16/478,918

(22) PCT Filed: Jan. 24, 2018

(86) PCT No.: PCT/NL2018/050049
§ 371 (c)(1),
(2) Date: Jul. 18, 2019

(87) PCT Pub. No.: WO2018/139921
PCT Pub. Date: Aug. 2, 2018

(65) Prior Publication Data
US 2019/0382210 A1   Dec. 19, 2019

(30) Foreign Application Priority Data

Jan. 25, 2017   (NL) ..................... 2018229

(51) Int. Cl.
*B65G 47/68*   (2006.01)
*A22C 17/00*   (2006.01)
(Continued)

(52) U.S. Cl.
CPC ........ *B65G 47/684* (2013.01); *A22C 17/0093* (2013.01); *B65G 47/5145* (2013.01);
(Continued)

(58) Field of Classification Search
CPC .............. B65G 47/684; B65G 47/5145; B65G 47/1485; B65G 21/2036; A22C 17/0093; A22C 21/0053
See application file for complete search history.

(56) References Cited

U.S. PATENT DOCUMENTS 4,401,207 A   8/1983   Garvey
4,773,527 A *  9/1988   Albiol-Catalan .... G01G 13/026
                                        177/25.18
(Continued)

FOREIGN PATENT DOCUMENTS

DE        34 37 312 C1    1/1989
DE   10 2010 022 988 A1   1/2011
(Continued)

OTHER PUBLICATIONS

Dutch Search Report, issued in Priority Application No. 2018229, dated Oct. 13, 2017.
(Continued)

*Primary Examiner* — William R Harp
(74) *Attorney, Agent, or Firm* — Birch, Stewart, Kolasch & Birch, LLP

(57) ABSTRACT

A slaughtered animal meat handling device and a method for transporting meat products from a receiving area to a discharge area device are provided. The device includes at least one supply conveyor, a suction transporter and at least one return conveyor. Meat products that are not engaged by the suction transporter are transported away from the transfer area towards the receiving area by the return conveyor. The meat products are reintroduced onto the supply conveyor away for the transfer area, for again being transported towards the transfer area. The supply conveyor and the return conveyor provide a circulation of meat products. By reintroducing the meat products onto the supply conveyor away from the transfer area, the chance of getting the meat (Continued)

products correctly positioned on the supply conveyor with respect to a suction opening of the suction transporter is increased.

20 Claims, 5 Drawing Sheets

(51) Int. Cl.
*B65G 47/51* (2006.01)
*A22C 21/00* (2006.01)
*B65G 21/20* (2006.01)
*B65G 47/14* (2006.01)

(52) U.S. Cl.
CPC ...... *A22C 21/0053* (2013.01); *B65G 21/2036* (2013.01); *B65G 47/1485* (2013.01); *B65G 2201/0202* (2013.01)

(56) References Cited

U.S. PATENT DOCUMENTS

| 5,314,055 | A | * | 5/1994 | Gordon | B25J 9/1697 |
| | | | | | 198/395 |
| 5,673,783 | A | * | 10/1997 | Radant | B65B 5/101 |
| | | | | | 198/418.6 |
| 5,701,989 | A | | 12/1997 | Boone et al. | |
| 6,235,998 | B1 | * | 5/2001 | Brewer | B65G 47/44 |
| | | | | | 177/103 |
| 7,770,717 | B2 | | 8/2010 | Pedersen | |
| 8,092,283 | B2 | * | 1/2012 | Hansen | B25J 9/0093 |
| | | | | | 452/121 |
| 9,212,006 | B1 | * | 12/2015 | Platiau | B65G 47/46 |
| 10,450,146 | B2 | * | 10/2019 | Kim | B65G 47/684 |

FOREIGN PATENT DOCUMENTS

| JP | 59-149224 A | 8/1984 |
| JP | 5-77930 A | 3/1993 |
| WO | WO 03/026987 A1 | 4/2003 |
| WO | WO 2007/042041 A1 | 4/2007 |

OTHER PUBLICATIONS

International Search Report, issued in PCT/NL2018/050049, dated Apr. 25, 2018.
Written Opinion of the International Searching Authority, issued in PCT/NL2018/050049, dated Apr. 25, 2018.

* cited by examiner

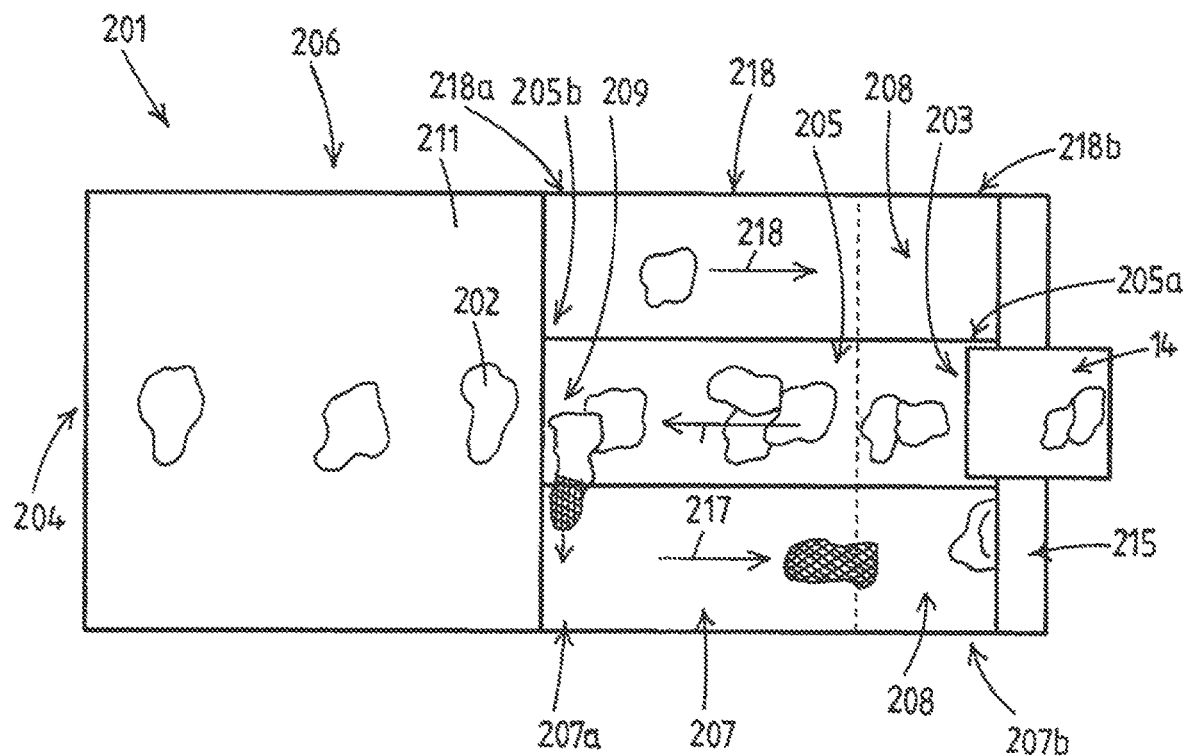
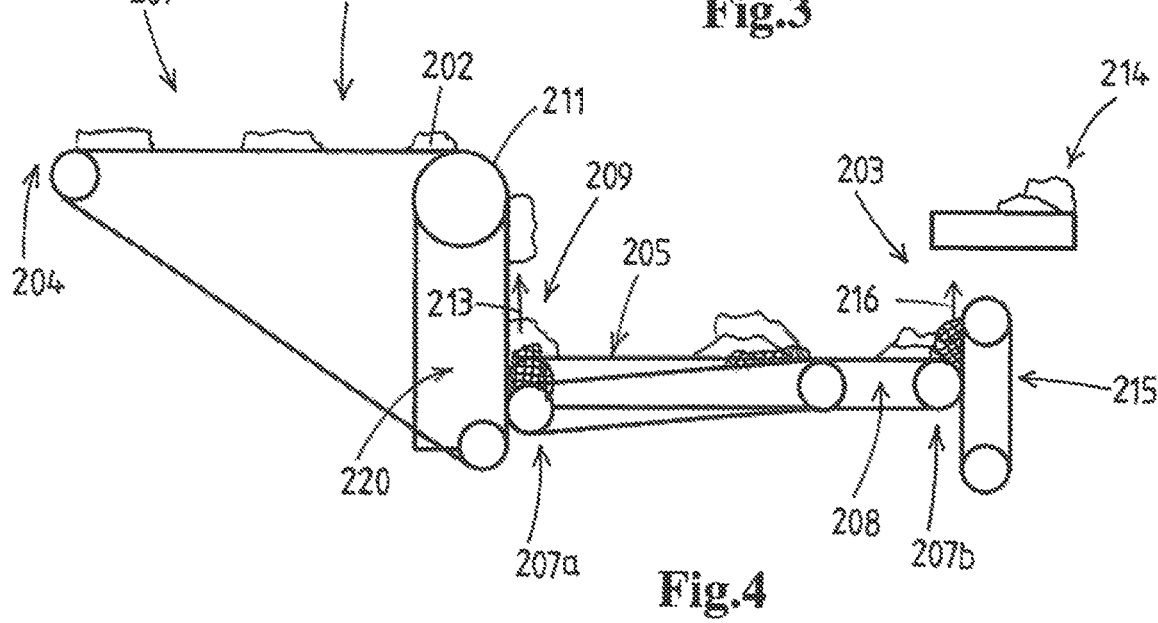

DEVICE AND METHOD FOR TRANSPORTING MEAT PRODUCTS

BACKGROUND OF THE INVENTION

1. Field of the Invention

The invention relates to a device and method for transporting meat products from a receiving area to a discharge area. Such a device and method are for example known from U.S. Pat. No. 7,770,717.

2. Description of Background Art

In the field of processing meat products it is desired to pick-up or grip meat products, presented at an irregular rate or in bulk, one by one and move or transfer them one by one, to thus unscramble and separate the meat products and to provide a stream of individual products. A product stream with gaps between the individual meat product allows for individual processing, e.g. weighing, handling cutting, packaging, of the meat products.

In particular in the field of processing pieces of meat from fish and poultry, it is known to pick-up or grip the meat products and move or transfer the meat products one by one using a suction conveyor provided with a substantially vertical conveyor belt. The conveyor belt is provided with a lane of interspaced suction openings. The suction openings having a small diameter relative to the size of the products to be picked up. A product is engaged when it covers the suction opening such that the underpressure pulls the product against the transport surface.

The meat products are presented in an unorderly form, either by conveyor or simply in bulk in a container, to the suction conveyor. The lane of interspaced suction openings in the conveyor belt causes the products to be picked up one by one. The products are transported by the suction conveyor from a transfer area to a discharge area. At the discharge area, the products can be discharged to a processing device, a subsequent conveyor, etc.

A bottleneck of the prior art solution is the presentation of the products to the suction conveyor.

The limited amount of suction openings, and the restricted size of the suction openings, which enables suction openings to engage a product, makes it important that the products are correctly presented to the suction conveyor, more in particular are correctly positioned relative to the lane of suction openings, to thus enable the suction conveyor to engage the products and lift them.

Furthermore, the limited amount of suction openings restricts the number of products that can be picked up in a given period of time.

Thus, products may pile up, causing products to be positioned out of reach of the suction openings, thus moving products out of the transportation process for prolonged periods of time or even permanently. This is in particular unwanted with food products for hygienic reasons.

It is submitted that in the prior art it is also known to use types of suction transporters for picking up, transporting, and releasing food items, other than vacuum conveyors. For example suction transporters comprising one or more pickers in the form of arms or levers provided with vacuum heads for engaging meat products. These types of transporters suffer the same type of problems regarding the presentation of the meat products to the pickup devices as disclosed above with respect to the vacuum conveyors.

SUMMARY OF THE INVENTION

It is an object of the invention to provide an improved slaughtered animal meat handling device for transporting meat products from a receiving area to a discharge area, wherein the device comprises a suction conveyor. In particular it is an object of the invention to improve the presentation of meat products to a suction conveyor.

The invention therefore provides a slaughtered animal meat handling device for transporting meat products from a receiving area to a discharge area, wherein the device comprises:
  at least one supply conveyor, which supply conveyor extends between the receiving area and a transfer area, for receiving meat products at the receiving area and for transporting the meat products in a substantially horizontal transport direction to the transfer area, the conveyor having a first end and a second end, which second end is located at the transfer area;
  a suction transporter for transporting meat products from the transfer area to the discharge area, which suction transporter has at least one suction opening for engaging the meat products supported by the supply conveyor in the transfer area, and which suction transporter is configured for lifting the engaged meat product from the supply conveyor and move the engaged meat product away from the transfer area; and
  at least one return conveyor, which return conveyor extends substantially parallel to the supply conveyor, for transporting meat products, that are provided in the transfer area by the supply conveyor and that are not engaged by the suction opening of the suction transporter, away from the transfer area and towards the receiving area, the return conveyor having a first end located at the transfer area next to the second end of the supply conveyor for receiving meat products from the supply conveyor,
wherein the slaughtered animal meat handling device is furthermore configured to, at a feedback area, move the meat products transported by the return conveyor away from the transfer area, from the return conveyor onto the supply conveyor for again being transported towards the transfer area, such that the supply conveyor and the return conveyor provide a circulation of meat products.

A slaughtered animal meat handling device according to the invention comprises a return conveyor that extends substantially parallel to the supply conveyor, and that has a first end located at the transfer area, next to the end of the supply conveyor. Thus, the return conveyor is configured for receiving a surplus of meat products provided in the transfer area by the supply conveyor. In this context, the term surplus of meat products refers to those meat products that are not engaged by the suction opening of the suction transporter and thus risk piling up at the end of the supply conveyor.

According to the invention, the meat products that are not engaged by the suction opening of the suction transporter are transported away from the transfer area towards the receiving area, and are reintroduced onto the supply conveyor away for the transfer area, for again being transported towards the transfer area. Thus, the supply conveyor and the return conveyor provide a circulation of meat products. By reintroducing the meat products onto the supply conveyor away from the transfer area, the chance of getting the meat products correctly positioned on the supply conveyor with respect to a suction opening of the suction transporter is increased.

Thus, excessive accumulation of products at the transfer area is prevented. The chance that meat products being positioned out of reach of the suction opening are also moved out of the transportation process for prolonged periods of time is significantly reduced.

By providing the device with a return conveyor according to claim 1, the invention provides an improved slaughtered animal meat handling device for transporting meat products from a receiving area to a discharge area, wherein the device comprises a suction conveyor. In particular the invention thus provides an improved presentation of meat products to a suction conveyor.

A slaughtered animal meat handling device according to the invention is in particular useful for the transportation of, more in particular for supplying a flow of, poultry meat products or fish meat products. These types of meat piece products have a consistency that allows for being engaged by suction openings. In an embodiment, the device is furthermore provided with a water supply, preferably comprising one or more spraying heads, for moisturising the meat pieces and/or the suction conveyor to further enhance the engagement of the meat piece products by the suction openings.

The supply conveyor extends between the receiving area and a transfer area. It has one end at the transfer area and an opposite end that may be positioned at or beyond the receiving area.

In an embodiment, the opposite end of the supply conveyor is located beyond the receiving area, allowing meat products to be reintroduced on the supply conveyor prior to the conveyor passing through the receiving area. Thus, the recirculated meat products are introduced on an empty transport surface of the supply conveyor, which enhances the chance they are positioned at the centre of the supply conveyor, in an optimal position for being engaged by the suction openings of the suction conveyor.

In an alternative embodiment, the feedback area and the receiving area coincide. In such an embodiment, the recirculated surplus of meat products is reintroduced onto the supply conveyor at the same location as the supply conveyor receives new meat products, i.e. meat products which have not yet been transported by the supply conveyor.

The supply conveyor and the one or more return conveyors preferably extend parallel to each other, for transporting meat products in opposite transport directions. In an embodiment, the width of the supply conveyor and the transport speed of the supply conveyor are similar to the width and the transport speed of the one or more return conveyors. In an alternative embodiment, these may differ. For example, the transport speed of the return conveyors may be higher than the transport speed of the supply conveyor, and the width of the return conveyors may be smaller than the width of the supply conveyor.

In an embodiment, the device at the transfer area comprises a feedback conveyor for promoting meat products to move from the supply conveyor to the return conveyor, and optionally from the supply conveyor to the second return conveyor, which feedback conveyor has a transport surface that has a substantially vertical orientation at the transfer area, and which vertical orientated transport surface extends along at least the width of the supply conveyor, preferably extends along at least the width of the supply conveyor and the return conveyor, and which feedback conveyor is located above the transport surface of the supply conveyor such that meat products transported by the supply conveyor are pushed by the supply conveyor against the vertical orientated transport surface of the feedback conveyor.

It has been recognized that the upwards movement of the feedback conveyor, in combination with the forward movement of the supply conveyor, can be utilized to move the meat products that are not engaged by the suction opening of the suction conveyor in a direction towards the return conveyor located adjacent the first end of the supply conveyor.

Thus, according to the invention, the meat products that are not engaged by the suction conveyor are transported away from the transfer area towards the receiving area, and are reintroduced onto the supply conveyor away for the transfer area, for again being transported towards the transfer area. Thus, the supply conveyor and the return conveyor provide a circulation of meat products. By reintroducing the meat products onto the supply conveyor away from the transfer area, the chance of getting the meat products correctly positioned on the supply conveyor with respect to a suction opening of the suction transporter is increased.

Thus, excessive accumulation of products at the transfer area is prevented. The chance that meat products being positioned out of reach of the suction opening are also moved out of the transportation process for prolonged periods of time is significantly reduced.

Typically the supply conveyor and the one or more return conveyors of a device according to the invention comprise an endless conveyor belt or track providing a transport surface for supporting the meat products. In contrast with e.g. a suction conveyor, the supply conveyor and the one or more return conveyors are configured not to engage the meat products but to provide a support surface, the meat products being held in position by gravity and friction between the meat products and the transport surfaces of the supply and return conveyors. Thus, the inclination of the transport surfaces preferably is limited. In particular the supply conveyor extends preferably in horizontal, or substantially horizontal, direction.

The return conveyors of a device according to the invention, at least at the transfer area, preferably extend parallel to the transport surface of the supply conveyor when seen in a plane perpendicular to the transport direction of the supply conveyor, i.e. do not have a transport surface that is inclined towards or away of the supply conveyor. In a plane parallel to the transport direction of the return conveyor, in a preferred embodiment the transport surface of the return conveyor extends at an angle to the horizontal, at least along a section of the transport trajectory, to thus transport meat products from a level lower than the transport surface of the supply conveyor at the transfer area, to a level equal to or higher than the transport surface of the supply conveyor at the transfer area.

In an embodiment of the slaughtered animal meat handling device according to the invention, the suction transporter is a suction conveyor, which suction conveyor extends between the transfer area and the discharge area, and which suction conveyor has a transport surface that, at the transfer area, has a substantially vertical orientation, and has a lane of suction openings, provided in the transport surface, for engaging the meat products provided by the supply conveyor in the transfer area and for lifting the meat products in a substantially vertical transport direction from the transfer area, and wherein the second end of the supply conveyor is aligned with the lane of suction openings of the suction transporter.

It has been recognized that the upwards movement of the conveyor belt of the suction conveyor, in combination with the forward movement of the supply conveyor, can be utilized to move the meat products that are not engaged by the suction openings of the suction conveyor in a direction towards the return conveyor located adjacent the first end of the supply conveyor.

Thus, according to the invention, the meat products that are not engaged by the suction conveyor are transported away from the transfer area towards the receiving area, and are reintroduced onto the supply conveyor away for the transfer area, for again being transported towards the transfer area. Thus, that the supply conveyor and the return conveyor provide a circulation of meat products. By reintroducing the meat peace products onto the supply conveyor away from the transfer area, the chance of getting the meat products correctly positioned on the supply conveyor with respect to a suction opening, in this particular embodiment to the lane of suction openings, is increased.

Thus, excessive accumulation of products at the transfer area is prevented. The chance that meat products being positioned out of reach of the suction opening, or openings, are also moved out of the transportation process for prolonged periods of time is significantly reduced.

The suction conveyor, at the transfer area, preferably has a vertical orientation, or substantially vertical orientation. Alternatively, the suction conveyor may be inclined relative to the vertical. In an embodiment, the suction conveyor comprises a drum, having a horizontal axis of rotation, which drum defines a curved transport trajectory. In such an embodiment, the supply conveyor preferably meets the curved suction conveyor at a location of the curved transport trajectory such that the main direction of displacement of a meat engaged by the suction conveyor is vertical.

Regarding the configuration of the suction conveyor, these types of conveyors are generally known and are therefore not discussed in extensive detail herein.

Typically, a suction conveyor comprises a belt with suction openings. The suction openings are small compared to the size of the meat product to be transported such that the product can overlap the opening and can thus substantially seal the suction opening. The low pressure provided at the side of the conveyor belt away from the transport surface, which makes that air is drawn through the suction openings, which in turn makes that a meat product overlapping the suction opening is sucked against the transport surface of the conveyor belt, i.e. at least the part of the transport surface directly around the suction opening.

It is submitted that with a suction conveyor configured to provide a stream of spaced apart products, the suction openings are located at intervals, when seen in the transport direction. Thus a lane of suction openings is provided. It is submitted that the suction openings can be provided in line with each other, i.e. are located on a centre line, said centre line extending in the transport direction, or may be staggered relative to each other, e.g. be provided alternately on opposite sides of such a centre line.

It is furthermore submitted that, to optimally present the meat products to the suction conveyor, the second end of the supply conveyor is aligned with the lane of suction openings of the suction conveyor. Preferably, the transport surface of the supply conveyor has a centre line, the centre line extending parallel to the transport direction of the supply conveyor, and which centreline of the supply conveyor is aligned with, i.e. cuts the, above mentioned centre line of the suction openings of the suction conveyor.

Preferably, the suction conveyor comprises a substantially vertical section for lifting products from the transfer area, and subsequently, i.e. downstream of the transfer area, converts into a substantially horizontal transport section with the transport surface of the suction conveyor facing upwards. When, at the substantially horizontal transport section, the underpressure behind the transport surface is reduced or even removed, the products are no longer engaged by the suction conveyor, but are only supported by the transport surface of the suction conveyor. Thus, the meat products can be transferred to a subsequent conveyor, e.g. an ordinary transport conveyor provided at the end of the horizontal section of the suction conveyor.

In an alternative embodiment, the suction conveyor comprises a substantially vertical section for lifting products from the transfer area, and subsequently, i.e. downstream of the transfer area, converts into a substantially horizontal transport section with the transport surface of the suction conveyor facing downwards. When, at the substantially horizontal transport section, the underpressure behind the transport surface is reduced or even removed, the products are no longer engaged by the suction conveyor and drop down, for example onto an ordinary transport conveyor provided below the horizontal section of the suction conveyor.

In a preferred embodiment, the suction conveyor comprises a transport belt with suction openings, which transport belt is guided over multiple rolls. In an alternative embodiment, the suction conveyor is provided in the form of a drum with suction openings, the outside surface of the drum forming the transport surface. Other prior art suction conveyors may also be used in a transport system according to the invention.

A slaughtered animal meat handling device according to the invention, when combined with a suction conveyor or a feedback conveyor comprising a substantially vertical transport surface, as discussed above, is in particular useful for supplying a stream of individual meat products, in particular poultry meat products, e.g. breast fillets of slaughtered poultry such as chickens, turkeys, ducks, etc., or fish meat products, e.g. salmon steak, etc. These types of meat piece products are characterized by having a sticky consistency, which makes the meat products stick to each other and to transport surfaces. Therefore, it is difficult to separate these types of meat products from each other and to provide a product stream of separated meat products, i.e. a stream of meat products with gaps between the individual meat pieces, in particular when the meat products are provided in batches of multiple meat piece products sticking to each other.

A slaughtered animal meat handling device utilising the upwards movement of the transport surface of the suction conveyor or feedback conveyor for moving the meat products sideways, i.e. from the supply conveyor to the return conveyor located adjacent the supply conveyor, enables supplying a stream of individual meat products, in particular of meat products having a sticky consistency.

The upwards movement of the feedback or suction conveyor in combination with the forward movement of the supply conveyor, creates a tumbling of meat products that are not engaged by the vacuum transporter. This tumbling movement makes meat peace products come loose from each other. Utilizing the upwards movement of the transport surface, more in particular the tumbling of the meat products, for moving the meat products towards the return conveyor located adjacent the supply conveyor at the transfer area, makes that the return conveyor receives the tumbling, i.e. loosened, products only. The return conveyor thus receives the loosened meat products, and, once sufficiently supported by the transport surface of the return conveyor, moves them away from the transfer area. Providing the return conveyor thus separates the loosened meat peace products from each other.

The loosening and separating of meat products is enhanced by extending the substantially vertical orientated transport surface beyond the width of the supply conveyor and along the receiving end of the return conveyor, in particular in combination with introducing a height difference between the transport surface of the supply conveyor and the transport surface of the return conveyor, the latter being located below the former.

Thus, such a slaughtered animal meat handling device makes it possible to join a production station configured to produce sticky meat products at an irregular rate or in bulk to a processing station which is configured to process meat products one after the other, e.g. a processing station configured for weighing, handling cutting or packaging, of the meat products.

In an embodiment, the device comprises a feedback conveyor and/or a suction conveyor comprising a substantially vertical transport surface. In a further preferred embodiment, the speed of the vertical transports surface of the suction conveyor and/or feedback conveyor is lower than the speed of the supply conveyor, preferably is less than 90% of the speed of the supply conveyor, more preferably is less than 80% of the speed of the supply conveyor. Thus, with the vertical transport surface having a reduced speed relative to the speed of transport surface of the supply conveyor, the preferred tumbling effect is achieved while the product integrity is maintained. It is submitted that in particular when used with sticky meat products, the tendency of the products to stick to the vertical transport surface may damage the products when the speed of the substantially vertical transport surface is similar to, or higher than the speed of the transport surface of the supply conveyor.

In an embodiment, the suction transporter is a suction conveyor, and the suction conveyor has a width at least equal to, preferably wider than, a width of the supply conveyor, to promote the sideway motion of meat products that are not engaged by the suction openings of the suction conveyor, onto the return conveyor or onto the return conveyor and second return conveyor.

It is submitted that, because the suction conveyor is provided with a lane of suction openings, i.e. a row of spaced section openings, for picking up products one at the time, a large area of the transport surface is no used for engaging and/or supporting products. In this embodiment according to the invention, the upwards movement of this transport surface is utilized for moving those products that are not engaged by the suction towards the return conveyor. The upward movement of the transport surface, in combination with the movement of products lifted from the transfer area and the movement of the supply conveyor and products provided on the supply conveyor into the transfer area, will result in movement of those products that are not engaged by the suction openings towards the return conveyor.

In a further embodiment the suction conveyor has a width at least equal to the combined width of the supply conveyor and the return conveyor, preferably has a width at least equal to the combined width of the supply conveyor, the return conveyor and the second return conveyor.

Thus, in such an embodiment, the suction conveyor transport surface is extended beyond what is required for engaging products in, and lifting products from, the transfer area. The transport surface extends not only along the end of the supply conveyor, but also along the end or ends of the return conveyor or return conveyors. Thus, the suction conveyor is optimally utilized in moving meat products not engaged by the suction openings onto the supply conveyors.

In an embodiment the device comprises a second return conveyor, which second return conveyor extends substantially parallel to the supply conveyor, such that the two return conveyors, i.e. the return conveyor and the second return conveyor, flank the supply conveyor on opposite sides thereof, for transporting meat products provided in the transfer area by the supply conveyor that are not engaged by the suction opening of the suction transporter, away from the transfer area and towards the receiving area, the second return conveyor having a first end located at the transfer area next to the second end of the supply conveyor for receiving meat products from the supply conveyor.

Thus, in such an embodiment, the supply conveyor is flanked on opposite sides by a return conveyor.

Preferably, the two return conveyors are substantially identical, i.e. have the same length, width and are drive with the same transport speed.

In a preferred embodiment, the two return conveyors, which typically both have one end located at the transfer area, have a similar length, and thus both have the same feedback area, i.e. both return conveyors return meat product onto the supply conveyor at the same location. This shared feedback area may be located upstream or downstream of the receiving area, or may overlap with the feedback area.

In an alternative embodiment, they may differ for example in length. In such an embodiment, the return conveyors, which typically both have one end located at the transfer area, have different feedback areas. For example, one transfer area may be located upstream the receiving area of the supply conveyor and one transfer area may be located downstream of the receiving area of the supply conveyor.

In a preferred embodiment, the return conveyors, at least along a trajectory between the transfer area and the feedback area are inclined in the direction of transportation, such that the transport meat products in an upward direction, from a level below the transport surface of the supply conveyor at the transfer area, to a level equal with or above the transport surface of the supply conveyor at the feedback area.

In an embodiment, the return conveyor, or the return conveyor and the second return conveyor, have a return roll in the transfer area, said return roll having an axis of rotation which axis of rotation extends in a substantially horizontal direction, and have a return roll in the feedback area, said return roll having an axis of rotation, which axis extends in a vertical, or substantially vertical direction, such that the return conveyor, or the return conveyor and second return conveyor, has or have a transport surface that gradually tilts towards the supply conveyor, to thus move meat products from the return conveyor onto the supply conveyor.

According to the invention, the meat products that are not engaged by the suction conveyor are transported away from the transfer area towards the receiving area, and are reintroduced onto the supply conveyor away for the transfer area, for again being transported towards the transfer area. Thus, that the supply conveyor and the return conveyor provide a circulation of meat products. By reintroducing the meat products onto the supply conveyor away from the transfer area, the chance of getting the correctly positioned on the supply conveyor with respect to the lane of suction openings is increased.

In an embodiment the return conveyor and/or the second return conveyor is/are configured to transport meat products in a direction parallel, but opposite to, the transport direction of the supply conveyor along at least 25%, preferably at least 50%, more preferably at least 75%, of the length of the supply conveyor, such that meat products are fed back onto the supply conveyor at a distance from the transfer area.

In a further embodiment, the supply conveyor and the return conveyor, or the return conveyor and the second return conveyor, have the same length, and preferably have ends located next to each other. In a further preferred embodiment, the supply conveyor and the return conveyor, or the return conveyor and the second return conveyor, form the bottom of a hopper like configuration, the walls of which are at one end formed by the suction conveyor and at an opposite end by the feedback conveyor. In yet another embodiment, the hopper like configuration is configured for use with a vacuum transporter other than a vacuum conveyor, or even for use with another type of product picker, and comprises feedback conveyors at both ends, i.e. at both ends of the supply conveyor, with feedback conveyors.

In an embodiment the supply conveyor, the return conveyor and/or the second return conveyor each have a transport surface, and, at the transfer area, the transport surface of the supply conveyor is located above the transport surface of the return conveyor and/or above the transport surface of the second return conveyor, such that a meat product, when moved from the supply conveyor onto the return conveyor or onto the second return conveyor, falls down onto the return conveyor or the second return conveyor.

Thus, when used in combination with a suction conveyor or feedback conveyor, the upwards movement of the transport surface of the conveyor is used in combination with a height difference to promote movement of products that are not engaged by the suction opening of the suction transporter towards the return conveyor or return conveyors. It has been found that the combination of these features works exceptionally well in propagating movement of the products towards the return conveyor or return conveyors.

According to the invention, the device is configured to, at a feedback area, move the meat products transported by the return conveyor away from the transfer area, from the return conveyor onto the supply conveyor for again being transported towards the transfer area, such that the supply conveyor and the return conveyor provide a circulation of meat products.

In an embodiment, the return conveyors transport meat products in a direction substantially parallel, and opposite, to the transport direction of the supply conveyor.

In an embodiment, the device is provided with a feedback chute that extends over the transport surface of the return conveyor, at an angle with the transport direction of the return conveyor, to push the meat products transported by the return conveyor towards the supply conveyor.

In an alternative embodiment, the device is provided with feedback conveyors at the end of the return conveyor, the feedback conveyors having a substantially horizontal or oblique transport surface for transporting meat products in a transport direction at an angle with, preferably perpendicular to, the transport direction of the return conveyor, which is a transport direction substantially parallel, and opposite, to the transport direction of the supply conveyor. The feedback conveyor receives the meat products transported by the return conveyor, and subsequently moves these meat products towards the supply conveyor.

In a preferred embodiment, the device at the feedback area comprises a feedback conveyor for promoting products to move from the return conveyor and/or the second return conveyor to the supply conveyor, which feedback conveyor has a transport surface that has a substantially vertical orientation at the feedback area, and which vertical orientated transport surface extends along at least the width of the return conveyor, preferably extends along at least the width of the return conveyor and the supply conveyor, and which feedback conveyor is located above the transport surface of the return conveyor such that meat products transported by the return conveyor are pushed against the vertical orientated transport surface of the feedback conveyor.

Preferably, the feedback conveyor has a width at least equal to the combined width of the supply conveyor, the return conveyor and the second return conveyor. Thus, a single feedback conveyor can be used for moving the meat products from both return conveyors towards the supply conveyor, which allows for a simple and efficient design of the device.

In an embodiment the supply conveyor, the return conveyor and/or the second return conveyor each have a transport surface, and, at the feedback area, the transport surface of the supply conveyor is level with the transport surface of the return conveyor and/or the transport surface of the second return conveyor, such that the transport surface of the supply conveyor and the transport surface of the return conveyor and/or the transport surface of the second return conveyor together define a substantially flat feedback area.

Providing a flat feedback area, i.e. a feedback area at which the transport surface of the return conveyor and the transport surface of the supply conveyor run level with each other, allows for easy transfer of the meat products from the return conveyor onto the supply conveyor.

In an alternative embodiment the supply conveyor, the return conveyor and/or the second return conveyor each have a transport surface, and, at the feedback area, the transport surface of the supply conveyor is located below the transport surface of the return conveyor and/or the transport surface of the second return conveyor, such that a meat product, when moved from the return conveyor or from the second return conveyor onto the supply conveyor, falls down onto the supply conveyor.

Thus, such an embodiment, a height difference is used to promote movement of products from the return conveyor towards the supply conveyor.

In an embodiment the device further comprises a second supply conveyor for receiving meat products at the receiving area and for transporting the meat products in a substantially horizontal transport direction to the transfer area and an associated second suction transporter for transporting meat products from the transfer area to the discharge area, wherein the second suction transporter has at least one suction opening for engaging the meat products supported by the second supply conveyor in the transfer area, and which second suction transporter is configured for lifting the engaged meat products from the second supply conveyor and move the engaged meat product away from the transfer area;

wherein the second supply conveyor extends, substantially parallel to the supply conveyor, between the receiving area and the transfer area, the second supply conveyor having a first end and a second end, which second end is located at the transfer area;

wherein the second supply conveyor is provided with:
    a return conveyor, which return conveyor extends substantially parallel to the second supply conveyor, for transporting meat products, that are provided in the transfer area by the second supply conveyor and that are not engaged by the suction opening of the second suction transporter, away from the transfer area and towards the receiving area, the return conveyor having a first end located at the transfer area next to the second end of the second supply conveyor for receiving meat products from the second supply conveyor, wherein preferably the return conveyor of the supply conveyor is also the return conveyor of the second supply conveyor, such that the supply conveyor and the second supply conveyor share the return conveyor.

In such an embodiment, the suction transporter is provided with a double capacity, and is able to produce parallel rows of meat products. Such a device is in particular beneficial for the parallel transportation of left side and right side breast filets of slaughtered poultry, or similar left and right side meat products.

In a preferred embodiment, the return conveyor of the supply conveyor is also the return conveyor of the second supply conveyor, such that the supply conveyor and the second supply conveyor share the return conveyor.

Thus, in such an embodiment, the shared return conveyor is located between the supply conveyor and second supply conveyor.

In a further embodiment the second supply conveyor is provided with:

a second return conveyor, which second return conveyor extends substantially parallel to the second supply conveyor such that the return conveyor and the second return conveyor flank the second supply conveyor on opposite sides thereof, for transporting meat products, that are provided in the transfer area by the second supply conveyor and that are not engaged by the suction opening of the second suction transporter, away from the transfer area and towards the receiving area, the second return conveyor having a first end located at the transfer area next to the second end of the second supply conveyor for receiving meat products from the second supply conveyor.

Thus, in such an embodiment, both the supply conveyor and the second supply conveyor each are flanked by a return conveyor and a second return conveyor. In an embodiment, the supply conveyor and second supply conveyors share the return conveyor, which is positioned between the two supply conveyors. In such an embodiment, the width of the shared return conveyor is preferably twice the width of the transport surface of the second return conveyors.

In a further embodiment, the suction transporter and the second suction transporter are combined in a suction conveyor, which suction conveyor extends between the transfer area and the discharge area, and which suction conveyor has a transport surface that, at the transfer area, has a substantially vertical orientation, which suction conveyor has a lane of suction openings, provided in the transport surface, for engaging the meat products provided by the supply conveyor in the transfer area and for lifting the meat products in a substantially vertical transport direction from the transfer area, and which suction conveyor has a second lane of suction openings, provided in the transport surface, for engaging the meat products provided by the second supply conveyor in the transfer area and for lifting the meat products in a substantially vertical transport direction from the transfer area, and wherein the second end of the supply conveyor is aligned with the lane of suction openings of the suction transporter; and wherein the second end of the second supply conveyor is aligned with the second lane of suction openings of the suction transporter.

The invention furthermore provides a recirculation conveyor unit configured for combining with a suction transporter to provide a device according to one or more of the preceding claims, wherein the recirculation conveyor unit comprises the supply conveyor and the return conveyor.

Such a circulation conveyor unit can thus be used to, in combination with an existing, prior art suction conveyor, provide a device according to the invention.

The invention furthermore provides a method for transporting slaughtered animal meat products from a receiving area to a discharge area, preferably using a slaughtered animal meat handling device according to one or more of the preceding claims, wherein the method comprises:

presenting the meat products at the receiving area and transporting the meat products from the receiving area to a transfer area using a supply conveyor, which supply conveyor extends between the receiving area and a transfer area, for receiving meat products at the receiving area and for transporting the meat products in a substantially horizontal transport direction to the transfer area, the supply conveyor having a first end and a second end, which second end is located at the transfer area;

lifting the meat products provided by the supply conveyor in the transfer area in a, preferably substantially vertical, transport direction from the transfer area and transporting the meat products to the discharge area, using a suction transporter, which suction transporter has at least one suction opening for engaging the meat products supported by the supply conveyor in the transfer area, and which suction transporter is configured for lifting the engaged meat product from the supply conveyor and move the engaged meat product away from the transfer area;

transporting meat products that are provided in the transfer area by the supply conveyor and that are not engaged by the suction opening of the suction transporter, away from the transfer area and towards the receiving area, using a return conveyor, which return conveyor extends substantially parallel to the supply conveyor, the return conveyor having a first end located at the transfer area next to the second end of the supply conveyor for receiving meat products from the supply conveyor; and at a feedback area, moving the meat products transported by the return conveyor away from the transfer area, by the return conveyor, back onto the supply conveyor for again being transported towards the transfer area, such that the supply conveyor and the return conveyor provide a circulation of meat products between the transfer area and the supply area. The invention thus provides a simple and efficient way for transporting slaughtered animal meat products from a receiving area to a discharge area, which method furthermore reduces the chance that meat products are moved out of the transportation process for prolonged periods of time.

The invention furthermore provides a slaughtered animal meat handling device for transporting meat products from a receiving area to a discharge area, wherein the suction transporter is replaced with a general pick up device, i.e. a pick up device for picking up meat products from the supply conveyor, and transporting the meat products to and releasing the meat products at a discharge area, which pick up device comprising one or more pickers, the pickers comprising for example piercing arms, gripper arms, or frozen tip pickup heads, for engaging the meat products presented by the supply conveyor at the transfer area.

Advantageous embodiments of the device according to the invention and the method according to the invention are disclosed in the subclaims and in the description, in which the invention is further illustrated and elucidated on the basis of a number of exemplary embodiments, of which some are shown in the schematic drawing.

BRIEF DESCRIPTION OF THE DRAWINGS

In the drawings;

FIG. 3 shows a schematic top view of a second exemplary embodiment of a slaughtered animal meat handling device for transporting meat products from a receiving area to a discharge area according to the invention;

FIG. 4 shows a schematic side view of the device of FIG. 3;

FIG. 5b shows a top view of the recirculation conveyor unit of FIG. 5a;

DETAILED DESCRIPTION OF THE INVENTION

Figure 1:
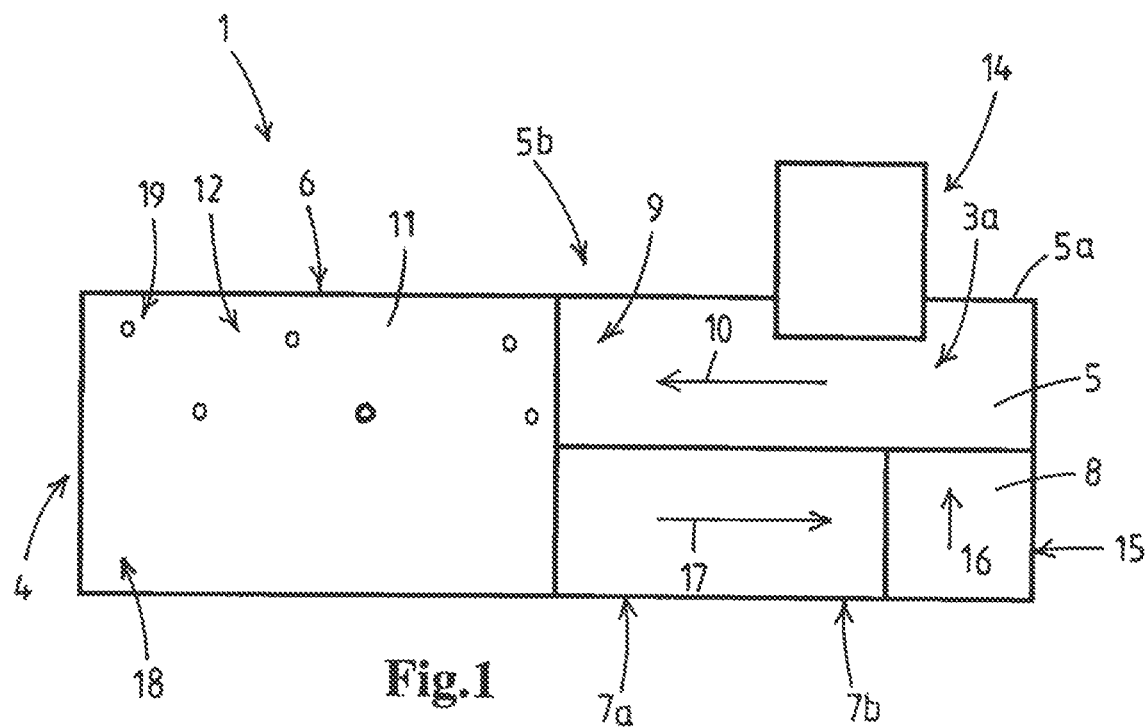
FIG. 1 shows a schematic top view of a first exemplary embodiment of a slaughtered animal meat handling device for transporting meat products from a receiving area to a discharge area according to the invention.
Figure 2:
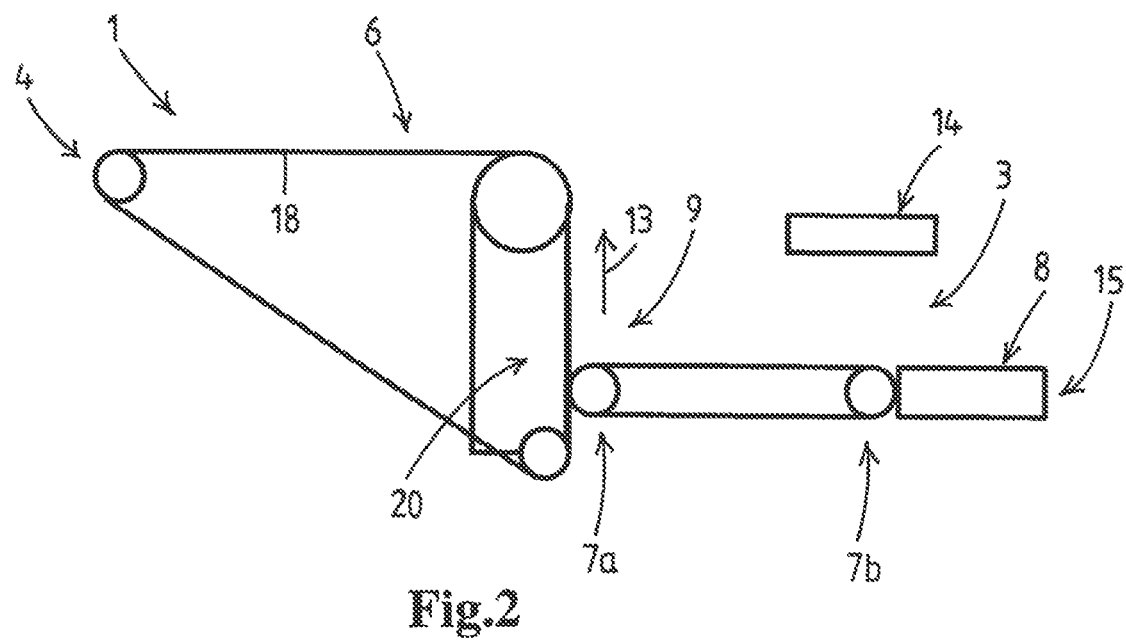
FIG. 2 shows a schematic side view of the device of FIG. 1

FIG. 1 shows a schematic top view of a first exemplary embodiment of a slaughtered animal meat handling device 1 for transporting meat products 2 from a receiving area 3 to a discharge area 4. FIG. 2 shows a schematic side view of the meat handling device 1 of FIG. 1.

The slaughtered animal meat handling device 1 for transporting meat products 2 comprises a supply conveyor 5, a suction conveyor 6, and a return conveyor 7.

In the particular embodiment shown in FIGS. 1 and 2, the device further comprises an infeed conveyor 14 and a feedback conveyor 15.

The supply conveyor 5 has a first end 5a and a second end 5b. In the particular embodiment shown, the first end 5a is located at a feedback area 8, and the second end 5b is located at a transfer area 9.

The suction conveyor 6 extends between the transfer area 9 and the discharge area 4. The suction conveyor 6 has a transport surface 11 that, at the transfer area 9, has a substantially vertical orientation. The transport surface 11 is provided with a lane of suction openings 12 for engaging the meat products 2.

The second end 5b of the supply conveyor 5 is aligned with the lane of suction openings 12 of the suction conveyor 6.

The return conveyor 7 extends in a direction substantially parallel to the supply conveyor 5. The return conveyor 7 has a first end 7a and a second end 7b. The first end 7a is located at the transfer area next to the second end 5b of the supply conveyor 5. In the particular embodiment shown, the second end 7b of the return conveyor is located adjacent the feedback conveyor 15.

Furthermore, in the particular embodiment shown, the return conveyor 7 is a transport conveyor comprising an endless belt or track providing the return conveyor with a transport surface for supporting and transporting the meat products. In the embodiment shown, the transport surface of the feedback conveyor extends in a substantially horizontal direction.

In the particular embodiment shown, meat products 2 are provided by the infeed conveyor 14, the end of which is located above the supply conveyor 5 for dropping meat products onto the supply conveyor at the receiving area 3.

The feedback conveyor 15 is provided at the feedback area 8. The feedback conveyor 15 is located at the second end 7b of the return conveyor 7 and extends in a direction perpendicular thereto, and over the width of the return conveyor 7.

In the particular embodiment shown, the supply conveyor 5, the return conveyor 7, the infeed conveyor 14 and the feedback conveyor 15 are transport conveyors comprising an endless belt or track providing the conveyor with a transport surface. In the particular embodiment shown, the transport surfaces of the conveyors extend in a substantially horizontal direction for supporting and transporting the meat products.

The supply conveyor 5 extends between the receiving area 3 and the transfer area 8, for receiving meat products 2 at the receiving area 3 and for transporting the meat products 2 in a substantially horizontal transport direction, indicated with arrow 10, to the transfer area 8.

The suction conveyor 6 is configured to engage the meat products 2 provided by the supply conveyor 5 in the transfer area 9, and to lift the meat products in a substantially vertical transport direction, indicated with arrow 13, from the transfer area 9.

The second end 5b of the supply conveyor 5 is located next to the first end 7a of the return conveyor 7 for receiving meat products 2 from the supply conveyor 5, such that the return conveyor can transport meat products provided in the transfer area by the supply conveyor away from the transfer area 9 and towards the receiving area 8. The transport direction of the return conveyor 7 is indicated with arrow 17.

At the feedback area 8, the meat products 2 transported by the return conveyor 7 away from the transfer area 9 are received by the feedback conveyor 15. The feedback conveyor is configured for moving the meat products in a transport direction, indicated with arrow 16, perpendicular to the transport direction 17 of the return conveyor 7.

Thus, in the particular embodiment shown, the surplus of meat products 2 is moved by the feedback 15 conveyor from the return conveyor 7 onto the supply conveyor 5 for again being transported towards the transfer area 9, such that the supply conveyor and the return conveyor provide a circulation of meat products.

By reintroducing the meat products onto the supply conveyor away from the transfer area, the chance of getting the correctly positioned on the supply conveyor with respect to the lane of suction openings is increased. Thus, excessive accumulation of products at the transfer area is prevented. The chance that meat products being positioned out of reach of the suction openings are also moved out of the transportation process for prolonged periods of time is significantly reduced.

In the embodiment shown in FIGS. 1 and 2, the second end 5b of the supply conveyor is located at the transfer area 9 and the first end 5a of the supply conveyor 5 is located beyond the receiving area 3, i.e. on a side of the receiving area 3 opposite the side at which the second end 5b of the supply conveyor 5 is located.

This configuration, i.e. locating the first end 5a of the supply conveyor 5 outside the receiving area 3, allows meat products to be reintroduced on the supply conveyor 5 prior to the conveyor passing through the receiving area 3. Thus, the recirculated meat products are introduced on an empty transport surface of the supply conveyor 5, which enhances the chance that they are positioned at the centre of the transport track of the supply conveyor, in an optimal position for being engaged by the suction openings of the suction conveyor 6.

The suction conveyor 6 comprises a belt 18 with suction openings 19. The suction openings 19 are small compared to the size of the meat products 2 such that a meat product can overlap the opening and can thus substantially seal the suction opening. In the embodiment shown, a suction device 20 is provided behind the conveyor belt 18 of the suction conveyor 6. The suction device 20 provides an underpressure at the side of the conveyor belt away from the transport surface, which reduced pressure makes that air is drawn via the suction openings, and thus makes that a product that overlaps the suction openings is engaged, i.e. is sucked against the transport surface of the conveyor belt by the suction openings.

In the embodiment shown in FIG. 1 and, the suction device 20 provides a underpressure behind the vertical section of the transport surface of the suction conveyor 6, and along a first part of the horizontal section of the suction conveyor 6. Thus, the meat products are engaged by the suction openings along the vertical section and along the first part of the horizontal section of the suction conveyor. Along the second part of the horizontal section of the suction conveyor the meat products are only supported by the transport surface of the suction conveyor and are no longer engaged by the suction openings. Thus, the meat products can be removed from the transport surface, e.g. can be transferred freely onto another conveyor located downstream of the suction conveyor.

FIG. 3 shows a schematic top view of a second exemplary embodiment of a slaughtered animal meat handling device 201 for transporting meat products 202 from a receiving area 203 to a discharge area 204. FIG. 4 shows a schematic side view of the device 201 of FIG. 3.

The slaughtered animal meat handling device 201 for transporting meat products 202 comprises a supply conveyor 205, a suction conveyor 206, and a return conveyor 2077.

In the particular embodiment shown in FIGS. 3 and 4, the device further comprises a second return conveyor 218, an infeed conveyor 214, and a feedback conveyor 215.

The supply conveyor 205 has a first end 205a and a second end 205b. In the particular embodiment shown, the first end 205a is located at a feedback area 208, and the second end 205b is located at a transfer area 209.

The suction conveyor 206 extends between the transfer area 209 and the discharge area 204. The suction conveyor 206 has a transport surface 211 that, at the transfer area 209, has a substantially vertical orientation. The transport surface 211 is provided with a lane of suction openings 212 for engaging the meat products 202.

The second end 205b of the supply conveyor 205 is aligned with the lane of suction openings 212 of the suction conveyor 206.

The return conveyor 207 and the second return conveyor 218 both extend in a direction substantially parallel to the supply conveyor 205. The return conveyor 207 has a first end 207a and a second end 207b. The second return conveyor 218 has a first end 218a and a second end 218b. The first ends 207a, 2018a are located at the transfer area next to the second end 205b of the supply conveyor 205. In the particular embodiment shown, the second ends 207b, 218b of the return conveyors are located adjacent the first end 205a of the supply conveyor 205.

In the particular embodiment shown, meat products 202 are provided by the infeed conveyor 214, the end of which is located above the supply conveyor 205, at the first end 205a thereof, for dropping meat products onto the supply conveyor at the receiving area 203.

In the particular embodiment shown, the feedback conveyor 215 has a transport surface that has a substantially vertical orientation. The feedback conveyor 215 is located along the second end 207b of the return conveyor 207, the second end 218b of the second return conveyor 207, and the first end 205a of the supply conveyor 205.

In the particular embodiment shown, the supply conveyor 205, the return conveyor 207, the second return conveyor 218, the infeed conveyor 214 and the feedback conveyor 215 are transport conveyors comprising an endless belt or track providing the conveyor with a transport surface.

In the particular embodiment shown, the transport surfaces of the supply conveyor 205 and the infeed conveyor 214 extend in a substantially horizontal direction for supporting and transporting the meat products.

In the particular embodiment shown, at the transfer area sections of the transport surfaces of the return conveyor 207 and the second return conveyor 218 extend in a substantially horizontal direction for supporting and transporting the meat products. A section of both the first and the second return conveyor 207, 218 extend at an angle to negotiate a height difference between the first ends of the return conveyors located at the transfer area and the sections of the return conveyors located at the feedback area, providing the return conveyors with an inclined transport surface along a section of the transport trajectory. The inclination of the transport surfaces is however such that the return conveyors can still engage and transport the meat products by friction induced by gravity.

The supply conveyor 205 extends between the receiving area 203 and the transfer area 208, for receiving meat products 202 at the receiving area 203 and for transporting the meat products 202 in a substantially horizontal transport direction, indicated with arrow 210, to the transfer area 208.

The suction conveyor 206 is configured to engage the meat products 202 provided by the supply conveyor 5 in the transfer area 9, and to lift the meat products in a substantially vertical transport direction, indicated with arrow 213, from the transfer area 209.

The second end 205b of the supply conveyor 205 is flanked by the first end 207a of the return conveyor 7 on one side and the first end 218a of the second return conveyor 218 on an opposite side. Thus, the device provides the surplus of meat products, i.e. the meat products that are not engaged by the suction openings, two options to move away from the lane of suction openings of the suction conveyor, which enhances the chance of the meat products being received by a return conveyor, such that the return conveyor can transport the meat product away from the transfer area 209 and towards the receiving area 208.

Furthermore, in the embodiment shown in FIGS. 3 and 4, the transport surface of the supply conveyor 205 is located above the transport surface of the return conveyor 207 and above the transport surface of the second return conveyor 218, such that a meat products of the surplus, when moved from the supply conveyor 205 onto the return conveyor 307 or the second return conveyor 218 at the transfer area, falls down onto the return conveyor.

Thus, in combination with the upwards movement provided by the transport surface of the suction conveyor 206, a height difference is used to promote movement of the meat products that are not engaged by the suction openings of the suction conveyor towards the return conveyors. It has been found that the combination of these features works exceptionally well in propagating movement of the products towards the return conveyor or return conveyors.

The transport direction of the return conveyor 207 is indicated with arrow 17. The transport direction of the second return conveyor 218 is indicated with arrow 219. Both the return conveyors end next to the beginning, i.e. the first end, of the supply conveyor 205, and at the feedback conveyor 215.

In the particular embodiment shown, the feedback conveyor 215, with its vertically orientated transport surface, is configured for moving the meat products in an upward transport direction, indicated with arrow 216. Because the feedback conveyor 215 is provided with an endless conveyor belt or track with no engagement mean, such as the suction openings of suction conveyors, the meat products are not lifted upwards by the feedback conveyor. Instead, the feedback conveyor generates a rolling motion.

At the feedback area 208, the meat product 202 transported by the return conveyor 207, or by the second return conveyor 218, are pushed against the vertical transport surface of the feedback conveyor 215. The upwardly directed transport direction of the feedback conveyor 215, in combination with the horizontally directed transport direction of the return conveyor 207 or the second return conveyor 218, more in particular the friction between the meat and the transport surface of the return conveyor and the transport surface of the feedback conveyor, moves the meat product towards the supply conveyor 205.

Thus, in the particular embodiment shown, the surplus of meat products 202 is moved by the feedback conveyor 215 from the return conveyor 207 or the second return conveyor 218 onto the supply conveyor 205 for again being transported towards the transfer area 209, such that the supply conveyor and the return conveyors provide a circulation of meat products.

In the embodiment shown in FIGS. 3 and 4, the feedback area 208 and the receiving area 203 coincide, i.e. overlap with each other. Thus, the recirculated surplus of meat products is reintroduced onto the supply conveyor 205 at the same location as the supply conveyor 205 receives new meat products from the infeed conveyor 214, i.e. meat products which have not yet been transported by the supply conveyor.

In the embodiment shown in FIGS. 3 and 4, the supply conveyor 205, the return conveyor 207 and the second return conveyor 218 each have a transport surface that, at the feedback area, are level with each other, such that the transport surface of the supply conveyor and the transport surface of the return conveyor and the transport surface of the second return conveyor together define a substantially horizontal feedback area.

Providing a feedback area at which the transport surface of the return conveyors and the transport surface of the supply conveyor run level with each other, allows for easy transfer of the meat products from the return conveyor onto the supply conveyor.

In the embodiment shown in FIGS. 3 and 4, the lane of suction openings of the suction conveyor 206 comprises multiple spaced apart suction openings. The suction openings provided in the suction conveyor 206 are not visible because they are covered by a meat product, i.e. a meat piece product is engaged by the suction openings. The suction openings are provided at intervals, i.e. are spaced apart, such that when they engage meat products, a stream of spaced apart products is provided.

In the embodiment shown in FIGS. 3 and 4, the suction openings are provided in line with each other, i.e. are located on a centre line, said centre line extending in the transport direction. In the embodiment shown in FIGS. 1 and 2, the suction openings are staggered relative to each other, e.g. are provided alternately on opposite sides of such a centre line.

In the embodiment shown in FIGS. 3 and 4, the return conveyor 207 and the second return conveyor 2018 have a similar length, and thus both have the same feedback area, i.e. both return conveyors return meat products onto the supply conveyor at the same location. This shared feedback area 208 overlaps with the feedback area 208.

In an alternative embodiment, the length of the return conveyor and the second return conveyor may differ. In such an embodiment, the return conveyors, which typically both have one end located at the transfer area, have different feedback areas. For example, one transfer area may be located upstream the receiving area of the supply conveyor and one transfer area may be located downstream of the receiving area of the supply conveyor.

In the embodiment shown in FIGS. 2 and 3, the suction conveyor has a width equal to the combined width of the supply conveyor and the return conveyor. Thus, the suction conveyor transport surface is extended beyond what is required for engaging products in, and lifting products from, the transfer area. The transport surface extends not only along the end of the supply conveyor, but also along the ends of the return conveyors. Thus, the suction conveyor is optimally utilized in moving meat products not engaged by the suction openings onto the return conveyors.

In the embodiment shown in FIGS. 3 and 4, the feedback conveyor 215 has a width at least equal to the combined width of the supply conveyor 205, the return conveyor 207 and the second return conveyor 218. Thus, a single feedback conveyor can be used for moving the meat products from both return conveyors towards the supply conveyor, which allows for a simple and efficient design of the device.

In the embodiment shown in FIGS. 3 and 4, the device 201 at the feedback area 208 comprises a feedback conveyor for promoting products to move from the return conveyor and the second return conveyor to the supply conveyor. The feedback conveyor 215 has a transport surface that has a substantially vertical orientation at the feedback area 208.

In the preferred embodiment shown, the feedback conveyor has a width at least equal to the combined width of the supply conveyor, the return conveyor and the second return conveyor. Thus, a single feedback conveyor can be used for moving the meat products from both return conveyors towards the supply conveyor, which allows for a simple and efficient design of the device.

Figure 5A:
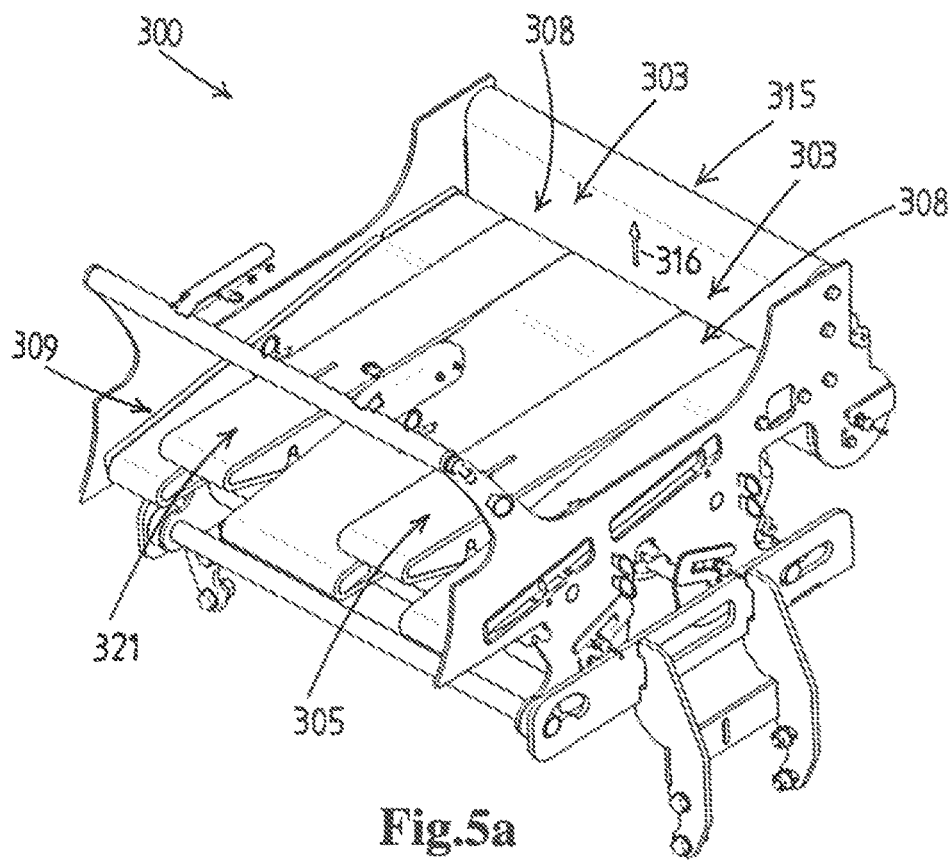
FIG. 5a shows a perspective view of an exemplary embodiment of a recirculation conveyor unit according to the invention.
Figure 5B:
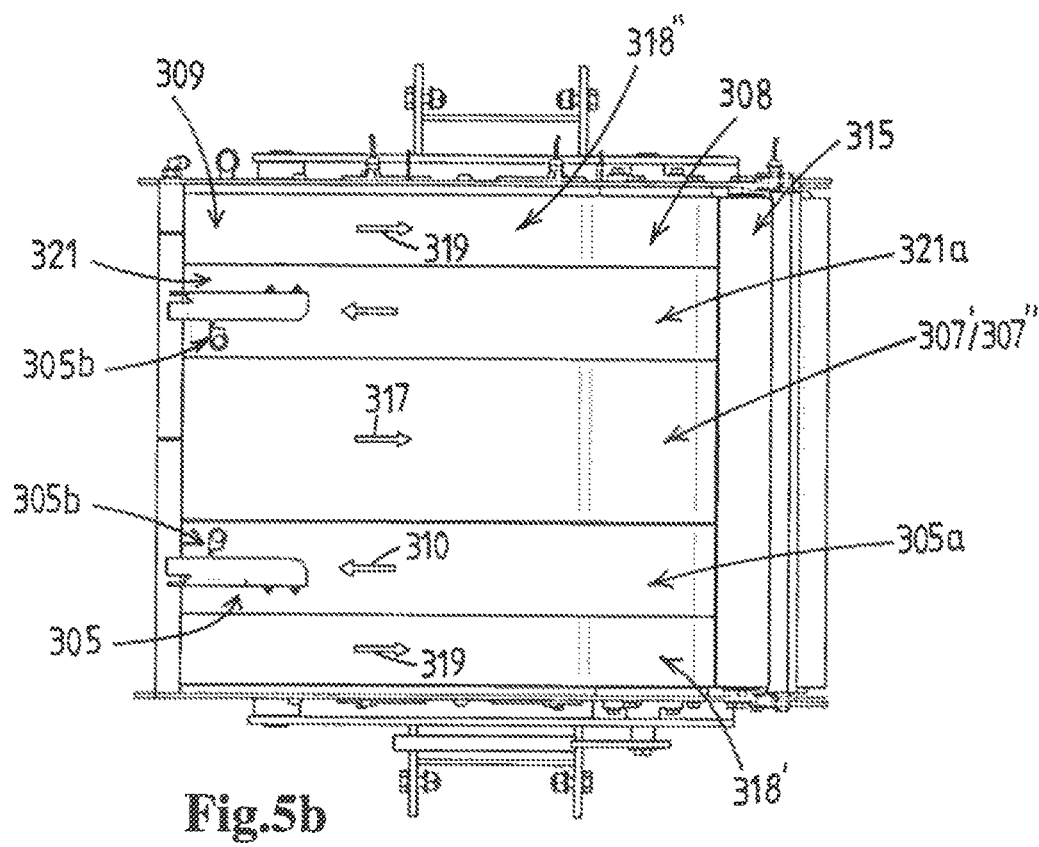

FIG. 5 shows a perspective view of an exemplary embodiment of a recirculation conveyor unit 300 according to the invention. More in particular, FIG. 5a shows a perspective view of the recirculation conveyor unit 300, while FIG. 5b shows a top view of the recirculation conveyor unit 300. The recirculation conveyor unit 300 comprises a first supply conveyor 305 and a first return conveyor 307 and a second return conveyor 318. The recirculation conveyor unit 300 is configured for combining with a suction conveyor to provide a device according to the invention.

Figure 6:
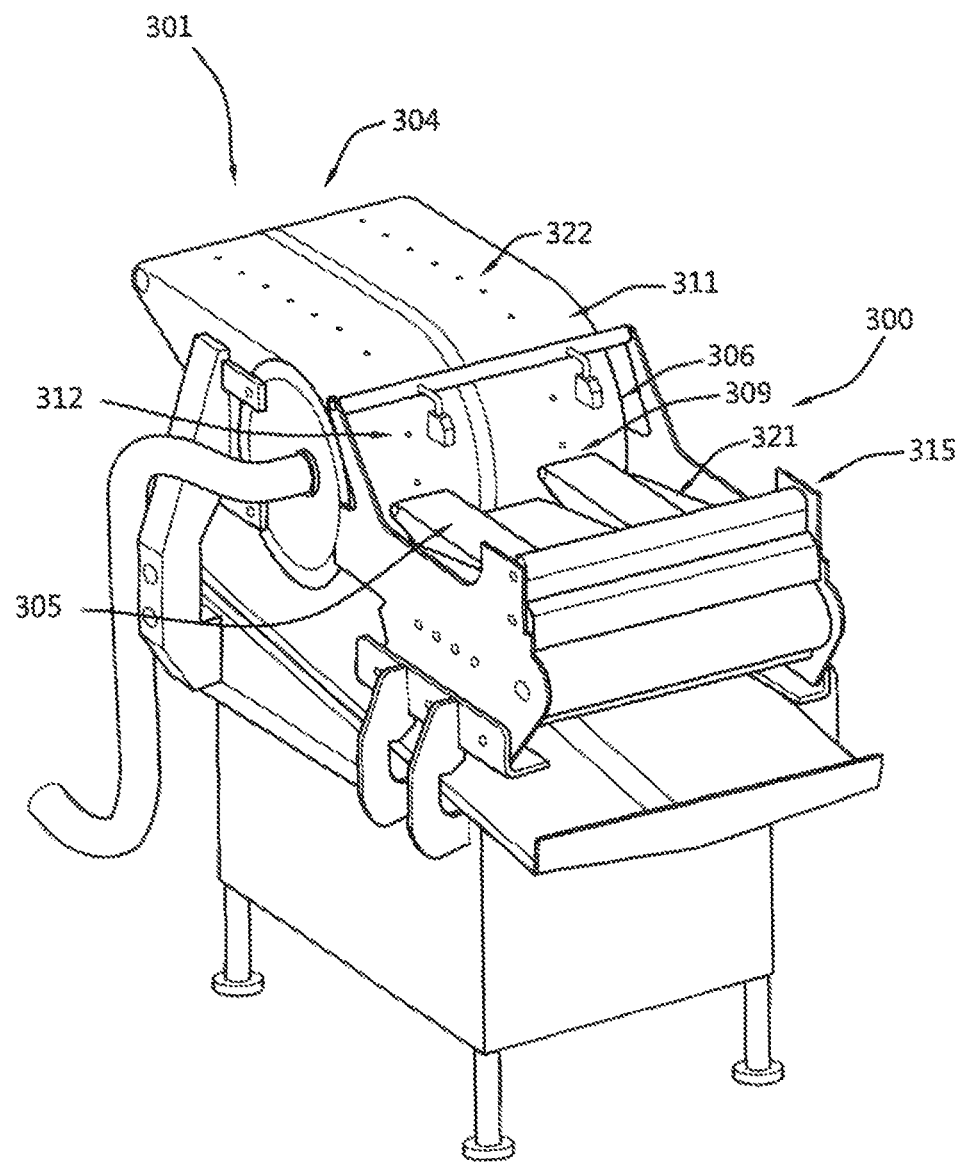
FIG. 6 shows a perspective view of a third exemplary embodiment of a slaughtered animal meat handling device according to the invention, comprising the recirculation conveyor unit of FIG. 5.

The circulation conveyor unit 300 can thus be used to, in combination with an existing, prior art suction conveyor, provide a device according to the invention. FIG. 6 shows a perspective view of a slaughtered animal meat handling device 301 comprising the recirculation conveyor unit 300 of FIG. 5.

The slaughtered animal meat handling device 301 is partially similar to the device shown in FIGS. 3 and 4. The main difference is that the device 301, in addition to a first supply conveyor 305, comprises a second supply conveyor 321, and a suction conveyor 306 having a second lane of suction openings 322. The second supply conveyor 321 is aligned with a second lane of suction openings 322.

Thus, the slaughtered animal meat handling device 301 for transporting meat products 302 comprises a first supply conveyor 305, a second supply conveyor 321, and a suction conveyor 306.

Thus, the device 301 is provided with a double capacity, and is able to produce parallel rows of meat products. Such a device is in particular beneficial for the parallel transportation of left side and right side breast filets of slaughtered poultry, or similar left and right side meat products.

In the embodiment shown in FIGS. 5 and 6, the second supply conveyor 321 extends, substantially parallel to the first supply conveyor 305, between the receiving area 303 and the transfer area 309, for receiving meat products at the receiving area and for transporting the meat products in a substantially horizontal transport direction to the transfer area, the supply conveyor having a first end and a second end, which second end is located at the transfer area and is aligned with the second lane of suction openings of the suction conveyor;

Furthermore, in the embodiment shown in FIGS. 5 and 6, both the first supply conveyor 305 and the second supply conveyor 321 have a first return conveyor 307', 307" and a second return conveyor 318', 318".

The first return conveyor 307' of the second supply conveyor 321 extends substantially parallel to the second supply conveyor, for transporting meat products provided in the transfer area 309 by the second supply conveyor 321 away from the transfer area and towards the receiving area 303. The first return conveyor 307*a* of the second supply conveyor 321 having a first end 307*aa* located at the transfer area 309 next to the second end 321*a* of the second supply conveyor 321 for receiving meat products from the supply conveyor.

The second return conveyor 318" of the second supply conveyor 321 extends substantially parallel to the first return conveyor 307" of the second supply conveyor 312 such that the first return conveyor 307" and the second return conveyors 318" flank the second supply conveyor 321 on opposite sides thereof, for transporting meat products provided in the transfer area 309 by the second supply conveyor away from the transfer area and towards the receiving area. The second return conveyor 318" having a first end 318*a* located at the transfer area 309 next to the second end 321*b* of the second supply conveyor 321 for receiving meat products from the second supply conveyor.

Thus, in the embodiment shown in FIGS. 5 and 6, the first supply conveyor 305 and the second supply conveyor 321 each are flanked by a first return conveyor 307', 307" and a second return conveyor 318', 318".

Furthermore, in the preferred embodiment shown, the first supply conveyor 305 and the second supply conveyor 321 share the first return conveyor, i.e. the first return conveyors 307', 307" are combined in a single return conveyor 307, which single return conveyor 307 is located between the two supply conveyors 305, 321, and which has a width that is twice the width of the transport surface of the second return conveyors 318', 318'.

In the particular embodiment shown in FIGS. 5 and 6, the device 301, more in particular the circulation conveyor unit 300, further comprises a feedback conveyor 315. In the embodiment shown, the feedback conveyor is similar to the feedback conveyor 215 of the device 201 shown in FIGS. 3 and 4.

In the embodiment shown in FIGS. 5 and 6, the feedback conveyor 315 has a width at least equal to the combined width of the two supply conveyors 305, 321, and their return conveyors 307, 318', 318". Thus, a single feedback conveyor is be used for moving the meat products from the return conveyors towards the supply conveyors, which allows for a simple and efficient design of the device.

In the embodiment shown in FIGS. 5 and 6, the suction conveyor 307 comprises a drum, having a horizontal axis of rotation, which drum defines a curved transport trajectory. In he preferred embodiment shown, the supply conveyors 305, 321 each meet the curved suction conveyor 307 at a location of the curved transport trajectory such that the main direction of displacement of a meat engaged by the suction conveyor in the transfer area is vertical.

Furthermore, in the preferred embodiment shown in FIGS. 5 and 6, the return conveyors 307, 318', 318" have a transport surface that, at the transfer area 309, is located between the transport surface of the first supply conveyor 305 and the second supply conveyor 321. Along a trajectory between the transfer area 309 and the feedback area 308, the transport surfaces of the return conveyors are inclined in the direction of transportation, such that the transport meat products in an upward direction, from a level below the transport surface of the supply conveyors at the transfer area, to a level equal with the transport surface of the supply conveyors at the feedback area.

Figure 7:
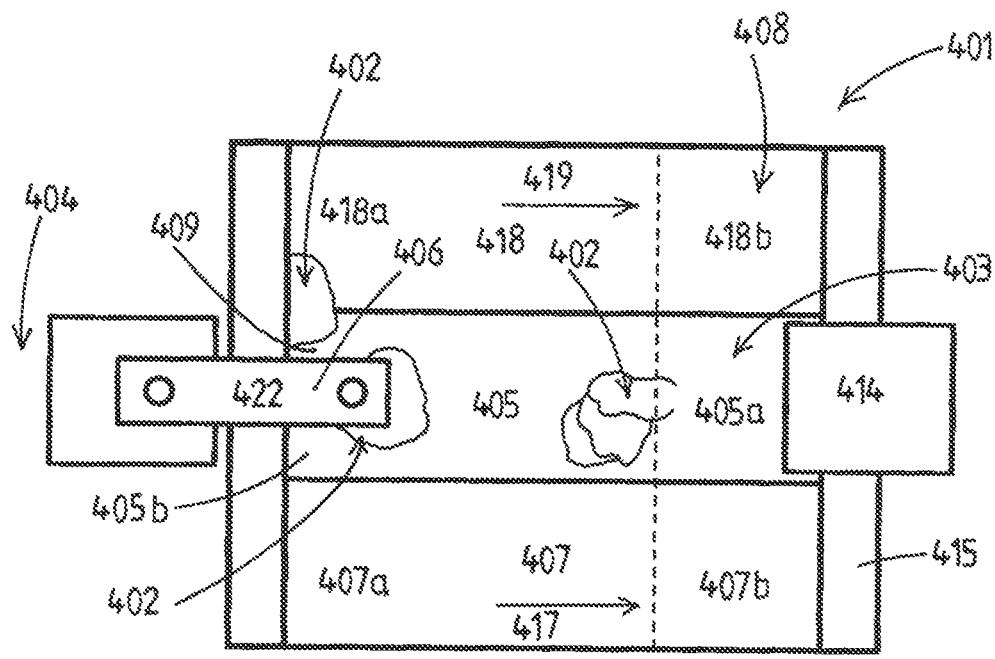
FIG. 7 shows a schematic top view of a fourth exemplary embodiment of a slaughtered animal meat handling device for transporting meat products from a receiving area to a discharge area according to the invention.
Figure 8:
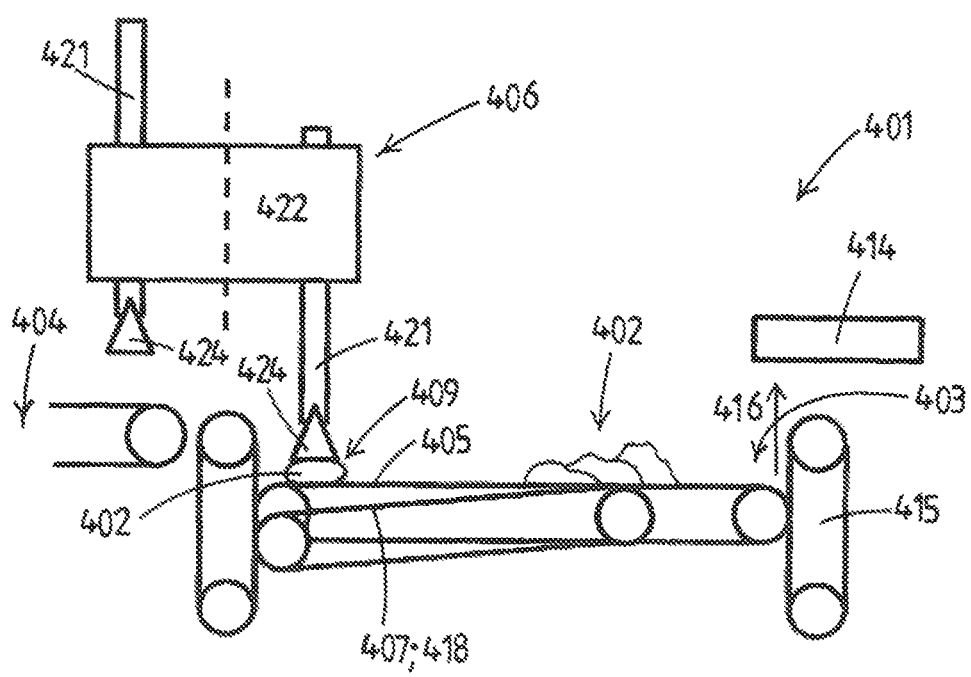
FIG. 8 shows a schematic side view of the device of FIG. 7.

FIG. 7 shows a schematic top view of a fourth exemplary embodiment of a slaughtered animal meat handling device 401 for transporting meat products 402 from a receiving area 403 to a discharge area 404. FIG. 8 shows a schematic side view of the meat handling device 401 of FIG. 7. It is submitted that the device shown in FIGS. 7 and 8 is partially similar to the device shown in FIGS. 3 and 4. The main difference is that in the embodiment shown in FIGS. 3 and 4 the suction transporter is configured as a suction conveyor.

The slaughtered animal meat handling device 401 for transporting meat products 402 comprises a supply conveyor 405, a suction transporter 406, and a return conveyor 407. The device further comprises a second return conveyor 418, an infeed conveyor 414, and a feedback conveyor 415.

The supply conveyor 405 has a first end 405*a* and a second end 405*b*. In the particular embodiment shown, the first end 405*a* is located at a feedback area 408, and the second end 405*b* is located at a transfer area 409.

The suction transporter 406, for transporting meat products from the transfer area 409 to the discharge area 404, comprises two pickers in 421. The pickers 421 are each at a bottom end provided with a suction head 424, the suction head comprising a suction opening for engaging a meat product. The pickers 421 are furthermore mounted on a pivotable frame 422, such that the can be moved in a vertical direction. Thus the pickers 421 can be lowered for engaging a meat product 402 supported by the supply conveyor 405 in the transfer area 409, and be lifted for subsequently lifting the meat 402 product from the transport surface of the supply conveyor 405. The pivotable frame 422 is configured such that it can pivot about a vertical axis 423 to thus move the pickers 421 from the transfer area 409 to the discharge area 404, and vice versa.

The second end 405b of the supply conveyor 405 is aligned with the pick up position of the pickers 421 of the suction transporter 406.

In the particular embodiment shown, meat products 402 are provided by the infeed conveyor 414, the end of which is located above the supply conveyor 405 for dropping meat products onto the supply conveyor at the receiving area 403.

The return conveyor 407 and the second return conveyor 418 both extend in a direction substantially parallel to the supply conveyor 405. The return conveyor 407 has a first end 407a and a second end 407b. The second return conveyor 418 has a first end 418a and a second end 418b. The first ends 407a, 4018a are located at the transfer area next to the second end 405b of the supply conveyor 405. In the particular embodiment shown, the second ends 407b, 418b of the return conveyors are located adjacent the first end 405a of the supply conveyor 405.

In the particular embodiment shown, meat products 402 are provided by the infeed conveyor 414, the end of which is located above the supply conveyor 405, at the first end 405a thereof, for dropping meat products onto the supply conveyor at the receiving area 403.

In the embodiment shown, a feedback conveyor 415 is provided at both ends of the supply conveyor 405. The feedback conveyors 415 both have a transport surface that has a substantially vertical orientation. The feedback conveyors 415 are located along the opposite second send 407a, 407b of the return conveyor 407, both ends 418a, 418b of the second return conveyor 407, and both ends 405a, 405b of the supply conveyor 405.

In the particular embodiment shown, the supply conveyor 405, the return conveyor 407, the second return conveyor 418, the infeed conveyor 414 and the feedback conveyor 415 are all transport conveyors comprising an endless belt or track providing the respective conveyors with a transport surface.

The transport surfaces of the supply conveyor 405 and the infeed conveyor 414 extend in a substantially horizontal direction for supporting and transporting the meat products.

At the transfer area sections of the transport surfaces of the return conveyor 407 and the second return conveyor 418 extend in a substantially horizontal direction for supporting and transporting the meat products. A section of both the return conveyor 207 and the second return conveyor 218 extend at an angle to negotiate a height difference between the first ends of the return conveyors located at the transfer area 209 and the sections of the return conveyors located at the feedback area 408, providing the return conveyors with an inclined transport surface along a section of the transport trajectory. The inclination of the transport surfaces is however such that the return conveyors can still engage and transport the meat products by friction induced by gravity.

The supply conveyor 405 extends between the receiving area 403 and the transfer area 408, for receiving meat products 402 at the receiving area 403 and for transporting the meat products 402 in a substantially horizontal transport direction, indicated with arrow 410, to the transfer area 408.

The suction transporter 406 is provided with pickers 421 having suction heads 424 for engaging the meat products 402 provided by the supply conveyor 405 in the transfer area 409, and to lift the meat products in a substantially vertical transport direction, indicated with arrow 413, from the transfer area 409. The meat products are subsequently moved in a substantially horizontal direction, over the feedback conveyor, towards the discharge area by pivoting the frame supporting the pickers. At the discharge area the meat product is dropped, by removing the underpressure at the suction opening, onto the discharge conveyor.

In the embodiment shown, the second end 405b of the supply conveyor 405 is flanked by the first end 407a of the return conveyor 7 on one side and the first end 418a of the second return conveyor 418 on an opposite side. Thus, the device 401 provides the meat products that are not engaged by the suction openings of the suction heads 424, two options to move away, from the supply conveyor onto a return conveyor. This enhances the chance of the meat products being received by a return conveyor, such that the return conveyor can transport the meat product away from the transfer area 409 and towards the receiving area 408.

Furthermore, in the embodiment shown in FIGS. 7 and 8, the transport surface of the supply conveyor 405 is located above the transport surface of the return conveyor 407 and above the transport surface of the second return conveyor 418, such that a meat products, when moved from the supply conveyor 405 onto the return conveyor 407 or onto the second return conveyor 418 at the transfer area, falls down onto the return conveyor.

Thus, in combination with the upwards movement provided by the transport surface of the feedback conveyor 415 located at the end of the supply conveyor, a height difference is used to promote movement of the meat products that are not engaged by the suction opening of a picker towards the return conveyors. It has been found that the combination of these features works exceptionally well in propagating movement of the products towards the return conveyor or return conveyors.

The transport direction of the return conveyor 407 is indicated with arrow 417. The transport direction of the second return conveyor 418 is indicated with arrow 419. Both the return conveyors end next to the beginning, i.e. the first end, of the supply conveyor 405, and at the feedback conveyor 415.

In the particular embodiment shown, the feedback conveyors 415, with their vertically orientated transport surfaces, are configured for moving the meat products in an upward transport direction, indicated with arrow 416. Because the feedback conveyors 415 are provided with an endless conveyor belt or track with no engagement mean, such as the suction openings of suction conveyors, the meat products are not lifted upwards by the feedback conveyors. Instead, the feedback conveyors generate a tumbling or rolling motion with the meat product contacting the transport surface of the feedback conveyor.

At the feedback area 408, the meat product 402 transported by the return conveyor 407, or by the second return conveyor 418, are again pushed against the vertical transport surface of the feedback conveyor 415. The upwardly directed transport direction of the feedback conveyor 415, in combination with the horizontally directed transport direction of the return conveyor 407 or the second return conveyor 418, more in particular the friction between the meat and the transport surface of the return conveyor and the transport surface of the feedback conveyor, moves the meat product in a tumbling motion and towards the supply conveyor 405.

Thus, in the particular embodiment shown, the meat products 402 are moved by a feedback conveyor 415 from the supply conveyor onto the return conveyor or the second return conveyor, and by a second feedback conveyor from the return conveyor 407 or the second return conveyor 418 onto the supply conveyor 405 for again being transported towards the transfer area 409, such that the supply conveyor and the return conveyors provide a circulation of meat products.

In the embodiment shown in FIGS. 7 and 8, the feedback area 408 and the receiving area 403 coincide, i.e. overlap with each other. Thus, the recirculated meat products are reintroduced onto the supply conveyor 405 at the same location as the supply conveyor 405 receives new meat products from the infeed conveyor 414, i.e. meat products which have not yet been transported by the supply conveyor.

In the embodiment shown in FIGS. 7 and 8, the supply conveyor 405, the return conveyor 407 and the second return conveyor 418 each have a transport surface that, at the feedback area, are level with each other, such that the transport surface of the supply conveyor and the transport surface of the return conveyor and the transport surface of the second return conveyor together define a substantially horizontal, flat feedback area.

Providing a flat feedback area at which the transport surface of the return conveyors and the transport surface of the supply conveyor run level with each other, allows for easy transfer of the meat products from the return conveyor onto the supply conveyor.

In the embodiment shown in FIGS. 7 and 8, the suction transporter comprises two spaced apart pickers. The suction openings provided in the suction heads of the pickers are not visible in the side and top view provided. The pivotable frame supporting the pickers spaces the pickers at intervals, i.e. spaced apart. This, in combination with the pivotable movement of the frame, enables the suction conveyor to provide the discharge conveyor with one meat product after the other, and thus allows for creating a flow of interspaced meat products.

In the embodiment shown in FIGS. 7 and 8, the return conveyor 407 and the second return conveyor 418 have a similar length, and thus both have the same feedback area, i.e. both return conveyors return meat products onto the supply conveyor at the same location. This shared feedback area 408 overlaps with the receiving area 403.

In the embodiment shown in FIGS. 7 and 8, the feedback conveyor located at the transfer area has a width equal to the combined width of the supply conveyor and both return conveyors. The feedback conveyor transport surface extends not only along the end of the supply conveyor, but also along the ends of the return conveyors. Thus, the feedback conveyor is optimally utilized in moving meat products not engaged by the pickers onto the return conveyors.

In the embodiment shown in FIGS. 7 and 8, the feedback conveyor 415 located at the feedback area also has a width at least equal to the combined width of the supply conveyor 405, the return conveyor 407 and the second return conveyor 418. Thus, a single feedback conveyor can be used for moving the meat products from both return conveyors towards the supply conveyor, which allows for a simple and efficient design of the device.

REFERENCE SIGNS 1 slaughtered animal meat handling device
2 meat products
3 receiving area
4 discharge area
5 supply conveyor
5a first end supply conveyor
5b second end supply conveyor
6 suction conveyor
7 return conveyor
7a first end return conveyor
7b second end return conveyor
8 feedback area
9 transfer area
10 transport direction supply conveyor
11 transport surface suction conveyor
12 lane of suction openings
13 transport direction of the suction conveyor at the transfer area
14 infeed conveyor
15 feedback conveyor
16 transport direction of feedback conveyor
17 transport direction of return conveyor
18 conveyor belt suction conveyor
19 suction openings
20 suction device
201 slaughtered animal meat handling device
202 meat products
203 receiving area
204 discharge area
205 supply conveyor
205a first end supply conveyor
205b second end supply conveyor
206 suction conveyor
207 return conveyor
207a first end return conveyor
207b second end return conveyor
208 feedback area
209 transfer area
210 transport direction supply conveyor
211 transport surface suction conveyor
212 lane of suction openings
213 transport direction of the suction conveyor at the transfer area
214 infeed conveyor
215 feedback conveyor
216 transport direction of feedback conveyor
217 transport direction of return conveyor
218 second return conveyor
218a first end second return conveyor
218b second end second return conveyor
219 transport direction of the second return conveyor
220 suction device
300 recirculation conveyor unit
301 slaughtered animal meat handling device
302 meat products
303 receiving area
304 discharge area
305 first supply conveyor
305a first end first supply conveyor
305b second end first supply conveyor
306 suction conveyor
307' first return conveyor first supply conveyor
307" first return conveyor second supply conveyor
307a first end first return conveyor
307b second end first return conveyor
308 feedback area
309 transfer area
310 transport direction first supply conveyor
311 transport surface suction conveyor
312 lane of suction openings
313 transport direction of the suction conveyor at the transfer area
314 infeed conveyor
315 feedback conveyor
316 transport direction of feedback conveyor
317 transport direction of first return conveyor 318' second return conveyor first supply conveyor
318" second return conveyor second supply conveyor
319 transport direction of the second return conveyor
320 suction device
321 second supply conveyor
321a first end second supply conveyor
321b second end second supply conveyor
322 second lane of suction openings
401 slaughtered animal meat handling device
402 meat products
403 receiving area
404 discharge area
405 supply conveyor
405a first end supply conveyor
405b second end supply conveyor
406 suction transporter
407 return conveyor
407a first end return conveyor
407b second end return conveyor
408 feedback area
409 transfer area
410 transport direction supply conveyor
411
412 suction opening suction transporter
413 transport direction of the suction transporter at the transfer area
414 infeed conveyor
415 feedback conveyor
416 transport direction of feedback conveyors
417 transport direction of return conveyor
418 second return conveyor
418a first end second return conveyor
418b second end second return conveyor
419 transport direction of the second return conveyor
4220 suction device
421 pickers
422 pivotable frame
423 vertical pivot axis
424 suction head

The invention claimed is:

1. A slaughtered animal meat handling device for transporting meat products from a receiving area to a discharge area, wherein the device comprises:
at least one supply conveyor, the supply conveyor extending between the receiving area and a transfer area, for receiving meat products at the receiving area and for transporting the meat products in a substantially horizontal transport direction to the transfer area, the conveyor having a first end and a second end, the second end being located at the transfer area;
a suction conveyor extending between the transfer area and the discharge area for transporting meat products from the transfer area to the discharge area, the suction conveyor having a transport surface which, at the transfer area, has a substantially vertical orientation, and having a lane of suction openings, provided in the transport surface for engaging the meat products supported by the supply conveyor in the transfer area, and the suction conveyor being configured for lifting the engaged meat product from the supply conveyor and moving the engaged meat product away from the transfer area, wherein the second end of the supply conveyor is aligned with the lane of suction openings of the suction conveyor; and
at least one return conveyor, the return conveyor extending substantially parallel to the supply conveyor, for transporting meat products, that are provided in the transfer area by the supply conveyor and that are not engaged by the suction opening of the suction conveyor, away from the transfer area and towards the receiving area, the return conveyor having a first end located at the transfer area next to the second end of the supply conveyor for receiving meat products from the supply conveyor,
wherein the slaughtered animal meat handling device is furthermore configured to, at a feedback area, move the meat products transported by the return conveyor away from the transfer area, from the return conveyor onto the supply conveyor for again being transported towards the transfer area, such that the supply conveyor and the return conveyor provide a circulation of meat products.

2. The slaughtered animal meat handling device according to claim 1, wherein the device comprises a second return conveyor, the second return conveyor extending substantially parallel to the supply conveyor, such that the return conveyor and the second return conveyor flank the supply conveyor on opposite sides thereof, for transporting meat products provided in the transfer area by the supply conveyor that are not engaged by the suction opening of the suction conveyor, away from the transfer area and towards the receiving area, the second return conveyor having a first end located at the transfer area next to the second end of the supply conveyor for receiving meat products from the supply conveyor.

3. The slaughtered animal meat handling device according to claim 1, wherein the transport surface of the suction conveyor has a width at least equal to a width of the supply conveyor, to promote a sideway motion of meat products that are not engaged by the suction openings of the suction conveyor, onto the return conveyor or onto the return conveyor and second return conveyor.

4. The slaughtered animal meat handling device according to claim 1, wherein the transport surface of the suction conveyor has a width at least equal to the combined width of the supply conveyor and the return conveyor.

5. The slaughtered animal meat handling device according to claim 1, wherein the supply conveyor and the return conveyor each have a transport surface, and
wherein, at the transfer area, the transport surface of the supply conveyor is located above the transport surface of the return conveyor, when moved from the supply conveyor onto the return conveyor, falls down onto the return conveyor.

6. The slaughtered animal meat handling device according to claim 1, wherein the supply conveyor and the return conveyor each have a transport surface, and
wherein, at the feedback area, the transport surface of the supply conveyor is level with the transport surface of the return conveyor, such that the transport surface of the supply conveyor and the transport surface of the return conveyor together define a substantially flat feedback area.

7. The slaughtered animal meat handling device according to claim 1, wherein the supply conveyor and the return conveyor each have a transport surface, and
wherein, at the feedback area, the transport surface of the supply conveyor is located below the transport surface of the return conveyor, such that a meat product, when moved from the return conveyor onto the supply conveyor, falls down onto the supply conveyor.

8. The slaughtered animal meat handling device according to claim 1, wherein the feedback area at least partially overlaps with the receiving area.

9. The slaughtered animal meat handling device according to claim 1, wherein the supply conveyor and the return conveyor each have a return roll at the transfer area, the return rolls each having an axis of rotation, the axis of rotation extending parallel to each other.

10. The slaughtered animal meat handling device according to claim 1, wherein the return conveyor is configured to transport meat products in a direction parallel, but opposite to, the transport direction of the supply conveyor along at least 25% of the length of the supply conveyor, such that meat products are fed back onto the supply conveyor at a distance from the transfer area.

11. The slaughtered animal meat handling device according to claim 1, wherein the device at the feedback area comprises a feedback conveyor for promoting meat products to move from the return conveyor to the supply conveyor, the feedback conveyor having a transport surface that has a substantially vertical orientation at the feedback area, and the vertical orientated transport surface extending along at least the width of the return conveyor, and the feedback conveyor being located above the transport surface of the return conveyor such that meat products transported by the return conveyor are pushed by the return conveyor against the vertical orientated transport surface of the feedback conveyor.

12. The slaughtered animal meat handling device according to claim 1, wherein the supply conveyor is a first supply conveyor, and wherein the device further comprises a second supply conveyor for receiving meat products at the receiving area and for transporting the meat products in a substantially horizontal transport direction to the transfer area and an associated second suction conveyor for transporting meat products from the transfer area to the discharge area, wherein the second suction conveyor has at least one suction opening for engaging the meat products supported by the second supply conveyor in the transfer area, and the second suction conveyor being configured for lifting the engaged meat products from the second supply conveyor and moving the engaged meat product away from the transfer area, wherein the second supply conveyor extends, substantially parallel to the first supply conveyor, between the receiving area and the transfer area, the second supply conveyor having a first end and a second end, the second end of the second supply conveyor being located at the transfer area, wherein the return conveyor of the first supply conveyor is also the return conveyor of the second supply conveyor, such that the first supply conveyor and the second supply conveyor share the return conveyor, and wherein the return conveyor extends substantially parallel to the second supply conveyor, for transporting meat products, that are provided in the transfer area by the second supply conveyor and that are not engaged by the suction opening of the second suction conveyor, away from the transfer area and towards the receiving area, the return conveyor having a first end located at the transfer area next to the second end of the second supply conveyor for receiving meat products from the second supply conveyor.

13. The slaughtered animal meat handling device according to claim 12, wherein the return conveyor is a first return conveyor, and wherein the second supply conveyor is provided with:

a second return conveyor, the second return conveyor extending substantially parallel to the second supply conveyor such that the first return conveyor and the second return conveyor flank the second supply conveyor on opposite sides thereof, for transporting meat products, that are provided in the transfer area by the second supply conveyor and that are not engaged by the suction opening of the second suction conveyor, away from the transfer area and towards the receiving area, the second return conveyor having a first end located at the transfer area next to the second end of the second supply conveyor for receiving meat products from the second supply conveyor.

14. The slaughtered animal meat handling device according to claim 12, wherein the suction conveyor and the second suction conveyor are combined in a suction conveyor, the suction conveyor extending between the transfer area and the discharge area, and the suction conveyor having a transport surface that, at the transfer area, has a substantially vertical orientation, wherein the suction conveyor has a lane of suction openings, provided in the transport surface, for engaging the meat products provided by the supply conveyor in the transfer area and for lifting the meat products in a substantially vertical transport direction from the transfer area, wherein the suction conveyor has a second lane of suction openings, provided in the transport surface, for engaging the meat products provided by the second supply conveyor in the transfer area and for lifting the meat products in a substantially vertical transport direction from the transfer area, wherein the second end of the supply conveyor is aligned with the lane of suction openings of the suction conveyor, and wherein the second end of the second supply conveyor is aligned with the second lane of suction openings of the suction conveyor.

15. A recirculation conveyor unit configured for combining with a suction conveyor to provide the device according to claim 1, wherein the recirculation conveyor unit comprises the supply conveyor and the return conveyor.

16. A method for transporting slaughtered animal meat products from a receiving area to a discharge area, using the slaughtered animal meat handling device according to claim 1, wherein the method comprises:

presenting the meat products at the receiving area and transporting the meat products from the receiving area to a transfer area using a supply conveyor, the supply conveyor extending between the receiving area and a transfer area, for receiving meat products at the receiving area and for transporting the meat products in a substantially horizontal transport direction to the transfer area, the supply conveyor having a first end and a second end, the second end being located at the transfer area;

lifting the meat products provided by the supply conveyor in the transfer area in a transport direction from the transfer area and transporting the meat products to the discharge area, using a suction conveyor, the suction conveyor having at least one suction opening for engaging the meat products supported by the supply conveyor in the transfer area, and the suction conveyor being configured for lifting the engaged meat product from the supply conveyor and moving the engaged meat product away from the transfer area;

transporting meat products that are provided in the transfer area by the supply conveyor and that are not engaged by the suction opening of the suction conveyor, away from the transfer area and towards the receiving area, using a return conveyor, the return conveyor extending substantially parallel to the supply conveyor, the return conveyor having a first end located at the transfer area next to the second end of the supply conveyor for receiving meat products from the supply conveyor; and at a feedback area, moving the meat products transported by the return conveyor away from the transfer area, by the return conveyor, back onto the supply conveyor for again being transported towards the transfer area, such that the supply conveyor and the return conveyor provide a circulation of meat products between the transfer area and the supply area.

17. A slaughtered animal meat handling device for transporting meat products from a receiving area to a discharge area, wherein the device comprises:

at least one supply conveyor, the supply conveyor extending between the receiving area and a transfer area, for receiving meat products at the receiving area and for transporting the meat products in a substantially horizontal transport direction to the transfer area, the conveyor having a first end and a second end, the second end being located at the transfer area;

a suction transporter for transporting meat products from the transfer area to the discharge area, the suction transporter having at least one suction opening for engaging the meat products supported by the supply conveyor in the transfer area, and suction transporter being configured for lifting the engaged meat product from the supply conveyor and moving the engaged meat product away from the transfer area;

a feedback conveyor at the transfer area for promoting meat products to move from the supply conveyor to a return conveyor, the feedback conveyor having a transport surface that has a substantially vertical orientation at the transfer area, and the vertical orientated transport surface extending along at least the width of the supply conveyor, and the feedback conveyor being located above the transport surface of the supply conveyor such that meat products transported by the supply conveyor are pushed by the supply conveyor against the vertical orientated transport surface of the feedback conveyor; and at least one return conveyor, the return conveyor extending substantially parallel to the supply conveyor, for transporting meat products, that are provided in the transfer area by the supply conveyor and that are not engaged by the suction opening of the suction transporter, away from the transfer area and towards the receiving area, the return conveyor having a first end located at the transfer area next to the second end of the supply conveyor for receiving meat products from the supply conveyor, wherein the slaughtered animal meat handling device is furthermore configured to, at a feedback area, move the meat products transported by the return conveyor away from the transfer area, from the return conveyor onto the supply conveyor for again being transported towards the transfer area, such that the supply conveyor and the return conveyor provide a circulation of meat products.

18. A slaughtered animal meat handling device for transporting meat products from a receiving area to a discharge area, wherein the device comprises:

at least one supply conveyor, which supply conveyor extends between the receiving area and a transfer area, for receiving meat products at the receiving area and for transporting the meat products in a substantially horizontal transport direction to the transfer area, the conveyor having a first end and a second end, which second end is located at the transfer area;

a pick up device for picking up meat products from the supply conveyor, and transporting the meat products to and releasing the meat products at the discharge area, which pick up device comprises one or more pickers for engaging the meat products presented by the supply conveyor at the transfer area;

a feedback conveyor at the transfer area for promoting meat products to move from the supply conveyor to a return conveyor, which feedback conveyor has a transport surface that has a substantially vertical orientation at the transfer area, and which vertical orientated transport surface extends along at least the width of the supply conveyor, and which feedback conveyor is located above the transport surface of the supply conveyor such that meat products transported by the supply conveyor are pushed by the supply conveyor against the vertical orientated transport surface of the feedback conveyor; and at least one return conveyor, which return conveyor extends substantially parallel to the supply conveyor, for transporting meat products, that are provided in the transfer area by the supply conveyor and that are not engaged by the pick up device, away from the transfer area and towards the receiving area, the return conveyor having a first end located at the transfer area next to the second end of the supply conveyor for receiving meat products from the supply conveyor, wherein the slaughtered animal meat handling device is furthermore configured to, at a feedback area, move the meat products transported by the return conveyor away from the transfer area, from the return conveyor onto the supply conveyor for again being transported towards the transfer area, such that the supply conveyor and the return conveyor provide a circulation of meat products.

19. The slaughtered animal meat handling device according to claim 17 or claim 18, wherein the device comprises a second return conveyor, the second return conveyor extending substantially parallel to the supply conveyor, such that the return conveyor and the second return conveyor flank the supply conveyor on opposite sides thereof, for transporting meat products provided in the transfer area by the supply conveyor that are not engaged by the suction transporter or the pick up device, away from the transfer area and towards the receiving area, the second return conveyor having a first end located at the transfer area next to the second end of the supply conveyor for receiving meat products from the supply conveyor.

20. The slaughtered animal meat handling device according to claim 17 or claim 18, wherein the transport surface of the suction conveyor has a width at least equal to a width of the supply conveyor, to promote a sideway motion of meat products that are not engaged by the suction transporter or the pick up device, onto the return conveyor or onto the return conveyor and second return conveyor.

\* \* \* \* \*